US012676971B2

(12) United States Patent
Ramasubramonian et al.

(10) Patent No.: US 12,676,971 B2
(45) Date of Patent: Jul. 7, 2026

(54) SUB-PARTITION INTRA PREDICTION

(71) Applicant: QUALCOMM Incorporated, San Diego, CA (US)

(72) Inventors: Adarsh Krishnan Ramasubramonian, Irvine, CA (US); Geert Van Der Auwera, San Diego, CA (US); Luong Pham Van, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 145 days.

(21) Appl. No.: 18/188,321

(22) Filed: Mar. 22, 2023

(65) Prior Publication Data

US 2023/0232000 A1      Jul. 20, 2023

Related U.S. Application Data

(62) Division of application No. 16/777,732, filed on Jan. 30, 2020, now abandoned.

(Continued)

(51) Int. Cl.
*H04N 19/119*      (2014.01)
*H04N 19/159*      (2014.01)
(Continued)

(52) U.S. Cl.
CPC ......... *H04N 19/119* (2014.11); *H04N 19/159* (2014.11); *H04N 19/176* (2014.11);
(Continued)

(58) Field of Classification Search
CPC .. H04N 19/119; H04N 19/159; H04N 19/167; H04N 19/176; H04N 19/46;
(Continued)

(56) References Cited

U.S. PATENT DOCUMENTS 8,265,405 B2      9/2012  Sugimoto et al.
9,058,659 B2      6/2015  Yie et al.
(Continued)

FOREIGN PATENT DOCUMENTS

CN          104685874 A      6/2015
CN          105247871 A      1/2016
WO      WO-2011126285 A2    10/2011

OTHER PUBLICATIONS

Bross B., et al., "Versatile Video Coding (Draft 4)," 13. JVET Meeting; Jan. 9, 2019-Jan. 18, 2019, Marrakech; (The Joint Video Exploration Team of ISO/IEC JTC1/SC29/WG11 and ITU-T SG. 16), No. JVET-M1001, Feb. 1, 2019 (Feb. 1, 2019), XP030202562, [7.3.4.6 Coding Unit Syntax], p. 38 Section [7.4.5.6 Coding Unit Semantics], p. 69 Section [8.3.4.1 General Decoding Process for Intra Blocks], p. 86, 241 Pages.
(Continued)

*Primary Examiner* — Maria E Vazquez Colon
(74) *Attorney, Agent, or Firm* — Polsinelli LLP

(57)      ABSTRACT

Techniques are described for improving intra-subpartitioning (ISP) mode for splitting coding blocks into sub-blocks. In some cases, whether ISP mode is enabled for a coding block is based on size constraints pertaining to data units (e.g., VPDUs, transform blocks, among others). For instance, based on a size constraint related to a VPDU, the ISP mode can be disabled for coding blocks crossing VPDU boundaries. In some cases, whether to enable ISP mode may be based on comparison of the width and/or height of the coding block to size thresholds corresponding to one or more maximum transform block sizes. In some cases, where the ISP mode is enabled for a coding block, a value of a flag used for defining a type of split, horizontal or vertical, for the coding block, can be inferred based on the width and/or height of the coding block relative to one or more thresholds.

20 Claims, 11 Drawing Sheets

100

Related U.S. Application Data

(60) Provisional application No. 62/801,625, filed on Feb. 5, 2019.

(51) Int. Cl.

| | |
|---|---|
| *H04N 19/176* | (2014.01) |
| *H04N 19/46* | (2014.01) |
| *H04N 19/59* | (2014.01) |
| *H04N 19/593* | (2014.01) |
| *H04N 19/61* | (2014.01) |

(52) U.S. Cl.
CPC ............. *H04N 19/46* (2014.11); *H04N 19/59* (2014.11); *H04N 19/593* (2014.11); *H04N 19/61* (2014.11)

(58) Field of Classification Search
CPC ...... H04N 19/59; H04N 19/593; H04N 19/61; H04N 19/70; H04N 19/96
See application file for complete search history.

(56) References Cited

U.S. PATENT DOCUMENTS

| | | | |
|---|---|---|---|
| 9,402,079 | B2 | 7/2016 | Alshina et al. |
| 9,769,472 | B2 | 9/2017 | Liu et al. |
| 2012/0114034 | A1 | 5/2012 | Huang et al. |
| 2020/0014947 | A1 | 1/2020 | Abe et al. |
| 2020/0252608 | A1 | 8/2020 | Ramasubramonian |
| 2021/0289197 | A1* | 9/2021 | Ko ........................ H04N 19/105 |
| 2021/0329233 | A1* | 10/2021 | Tsai ..................... H04N 19/186 |
| 2021/0392371 | A1 | 12/2021 | Lee et al. |

OTHER PUBLICATIONS

Chen J., et al., "Algorithm Description for Versatile Video Coding and Test Model 3 (VTM 3)," 12th JVET Meeting, Oct. 3, 2018-Oct. 12, 2018, MACAO, (The Joint Video Exploration Team of ISO/IEC JTC1/SC29/WG11 and ITU-T SG. 16 WP 3), No. JVET-L1002-v1, Dec. 24, 2018 (Dec. 24, 2018), XP030251962, pp. 1-48, [3.2.2 Partitioning of the CTUs Using a Tree Structure], Section [3.2.5 Virtual Pipeline Data Units (VPDUs)], section 3.7 p. 1.

International Preliminary Report on Patentability—PCT/US2020/016260 , The International Bureau of WIPO—Geneva, Switzerland, Aug. 19, 2021.

International Search Report and Written Opinion—PCT/US2020/016260—ISA/EPO—Aug. 3, 2020.

Jang (Lge) H., et al., "CE3-Related : Disable ISP Mode for 128xN, Nx128 Block," 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0469, Mar. 13, 2019 (Mar. 13, 2019), XP030203114, The Whole Document, 5 pages.

Partial International Search Report—PCT/US2020/016260—ISA/EPO—Jun. 2, 2020.

Taiwan Search Report—TW109103106—TIPO—Jul. 27, 2023.

Taiwan Search Report—TW113138856—TIPO—Dec. 16, 2025.

* cited by examiner

100

Current Block
202

Original H x W partition

W

H

ISP block
204a

ISP block
204b

W

H/2   H/2

Horizontal Split

ISP Block
206a

ISP Block
206b

W/2   W/2

H

Vertical Split

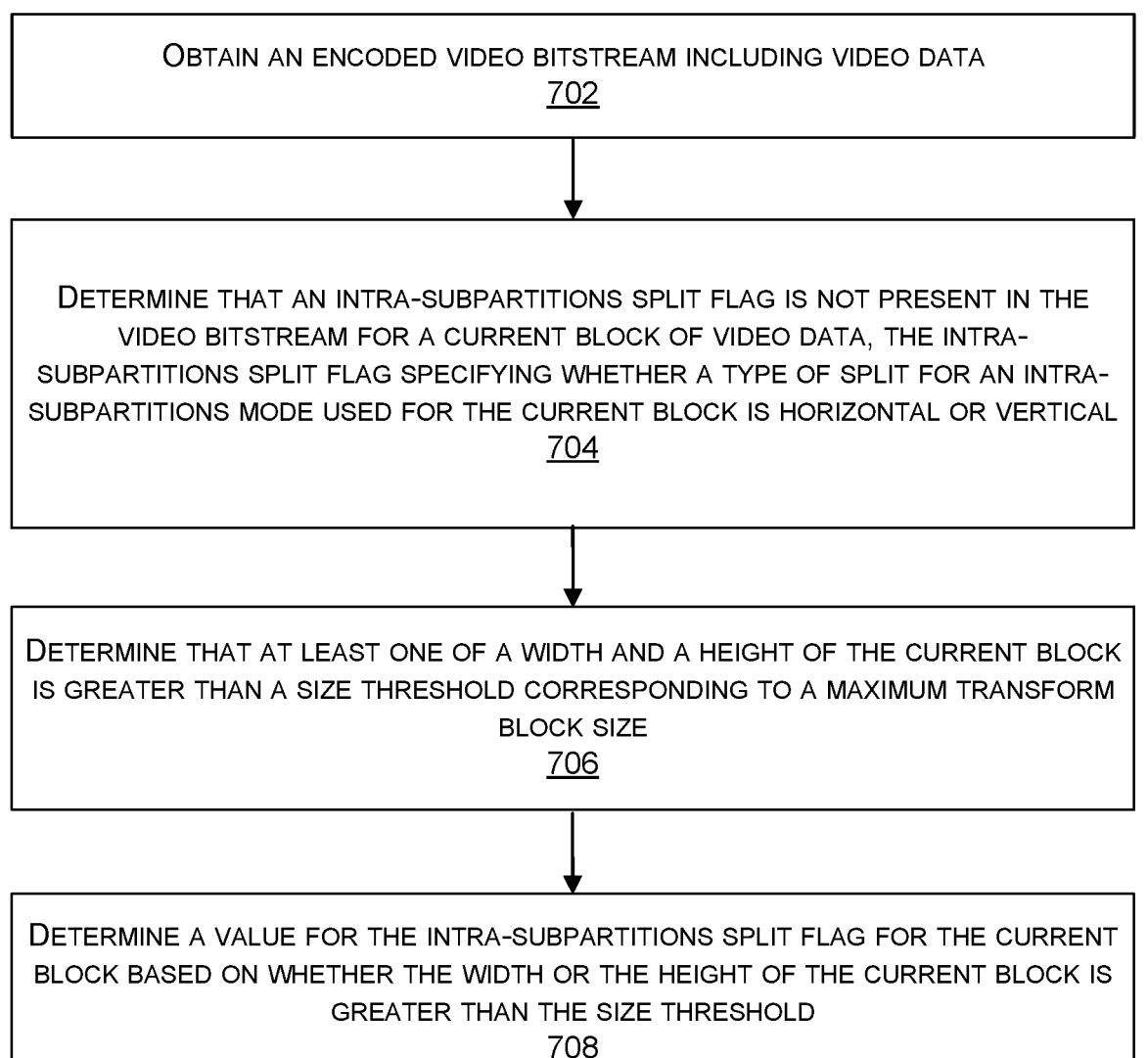

700

OBTAIN AN ENCODED VIDEO BITSTREAM INCLUDING VIDEO DATA
702

DETERMINE THAT AN INTRA-SUBPARTITIONS SPLIT FLAG IS NOT PRESENT IN THE VIDEO BITSTREAM FOR A CURRENT BLOCK OF VIDEO DATA, THE INTRA-SUBPARTITIONS SPLIT FLAG SPECIFYING WHETHER A TYPE OF SPLIT FOR AN INTRA-SUBPARTITIONS MODE USED FOR THE CURRENT BLOCK IS HORIZONTAL OR VERTICAL
704

DETERMINE THAT AT LEAST ONE OF A WIDTH AND A HEIGHT OF THE CURRENT BLOCK IS GREATER THAN A SIZE THRESHOLD CORRESPONDING TO A MAXIMUM TRANSFORM BLOCK SIZE
706

DETERMINE A VALUE FOR THE INTRA-SUBPARTITIONS SPLIT FLAG FOR THE CURRENT BLOCK BASED ON WHETHER THE WIDTH OR THE HEIGHT OF THE CURRENT BLOCK IS GREATER THAN THE SIZE THRESHOLD
708

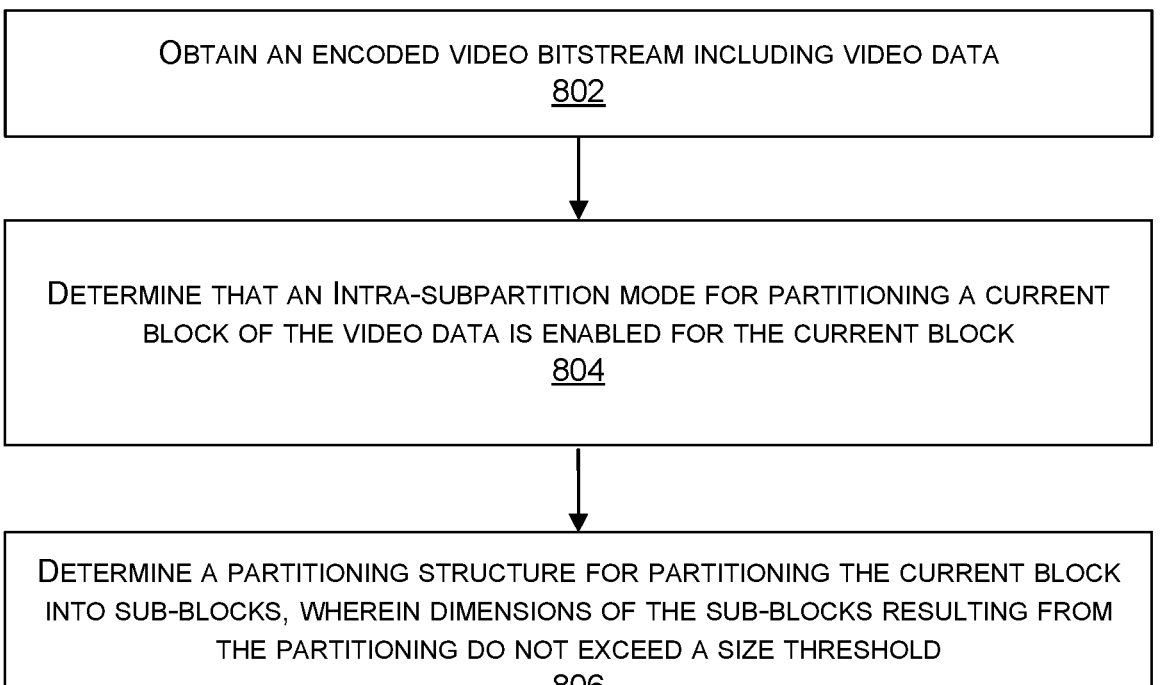

OBTAIN AN ENCODED VIDEO BITSTREAM INCLUDING VIDEO DATA
802

DETERMINE THAT AN INTRA-SUBPARTITION MODE FOR PARTITIONING A CURRENT BLOCK OF THE VIDEO DATA IS ENABLED FOR THE CURRENT BLOCK
804

DETERMINE A PARTITIONING STRUCTURE FOR PARTITIONING THE CURRENT BLOCK INTO SUB-BLOCKS, WHEREIN DIMENSIONS OF THE SUB-BLOCKS RESULTING FROM THE PARTITIONING DO NOT EXCEED A SIZE THRESHOLD
806

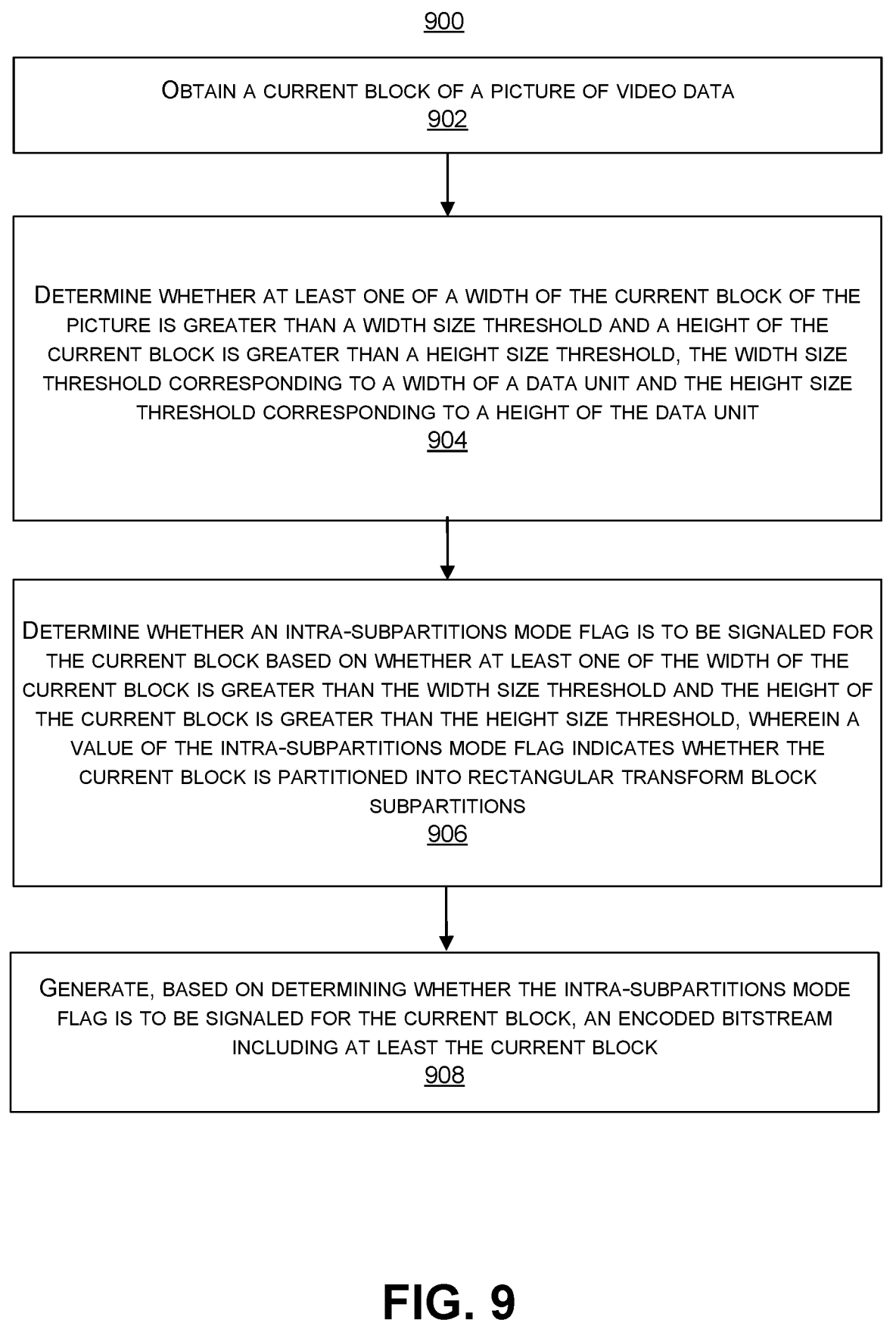

OBTAIN A CURRENT BLOCK OF A PICTURE OF VIDEO DATA
902

DETERMINE WHETHER AT LEAST ONE OF A WIDTH OF THE CURRENT BLOCK OF THE PICTURE IS GREATER THAN A WIDTH SIZE THRESHOLD AND A HEIGHT OF THE CURRENT BLOCK IS GREATER THAN A HEIGHT SIZE THRESHOLD, THE WIDTH SIZE THRESHOLD CORRESPONDING TO A WIDTH OF A DATA UNIT AND THE HEIGHT SIZE THRESHOLD CORRESPONDING TO A HEIGHT OF THE DATA UNIT
904

DETERMINE WHETHER AN INTRA-SUBPARTITIONS MODE FLAG IS TO BE SIGNALED FOR THE CURRENT BLOCK BASED ON WHETHER AT LEAST ONE OF THE WIDTH OF THE CURRENT BLOCK IS GREATER THAN THE WIDTH SIZE THRESHOLD AND THE HEIGHT OF THE CURRENT BLOCK IS GREATER THAN THE HEIGHT SIZE THRESHOLD, WHEREIN A VALUE OF THE INTRA-SUBPARTITIONS MODE FLAG INDICATES WHETHER THE CURRENT BLOCK IS PARTITIONED INTO RECTANGULAR TRANSFORM BLOCK SUBPARTITIONS
906

GENERATE, BASED ON DETERMINING WHETHER THE INTRA-SUBPARTITIONS MODE FLAG IS TO BE SIGNALED FOR THE CURRENT BLOCK, AN ENCODED BITSTREAM INCLUDING AT LEAST THE CURRENT BLOCK
908

FIG. 9

SUB-PARTITION INTRA PREDICTION

CROSS-REFERENCES TO RELATED APPLICATIONS

This application is a Divisional of U.S. Non-Provisional application Ser. No. 16/777,732, filed on Jan. 30, 2020, which claims the benefit of U.S. Provisional Application No. 62/801,625, filed on Feb. 5, 2019, both of which are hereby incorporated by reference, in their entirety and for all purposes.

FIELD

This application is related to video coding. More specifically, this application relates to systems, methods, and computer-readable media for performing improved video coding.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Systems and methods are described herein for improving the use of an intra-subpartitioning (ISP) mode for splitting coding blocks of video data into sub-blocks. In some examples, a decision on whether an ISP mode can be allowed for a coding block may be based on size constraints. The size constraints can be implemented based on one or more size thresholds defined based on a size of a data unit. For example, a width size threshold can be defined as a width of a data unit and a height size threshold can be defined as a height of the data unit. In some cases, a single threshold can be defined (e.g., when the width and height of the data unit are equal). The data unit can include a Virtual Pipeline Data Unit (VPDU), a transform block, or other data unit or block. In one illustrative example, one or more size thresholds can be used to prevent the ISP mode from being enabled for coding blocks which cross VPDU boundaries. Such constraints, referred to as VPDU constraints, improve the processing efficiencies of VPDUs by ensuring that sub-blocks obtained from splitting a coding block are not processed separately in different VPDUs.

In some examples, a determination of whether to enable splitting of a coding block using the ISP mode may be based on a comparison of the width and height of the coding block to size thresholds corresponding to one or more maximum transform block sizes. In some examples, where the ISP mode is enabled for a coding block, an optimal type of split (horizontal or vertical) can be determined based on the width and height of the coding block.

In some examples, a partitioning structure for the ISP mode is provided. The partitioning structure ensures that the dimensions of sub-blocks obtained by partitioning a coding block do not violate a size threshold such as the maximum transform block size. In some examples, a recursive tree structure is provided for ensuring that the sub-partition split type is determined to be horizontal or vertical in a manner which leads to sizes of the sub-blocks being compliant with the maximum transform block size threshold requirements. In some examples, the number of sub-blocks that a coding block is split into is determined such that the dimensions of the sub-blocks are compliant with the maximum transform block size threshold requirements. In some examples, enabling the ISP mode is adjusted to ensure that dimensions of sub-blocks obtained from splitting a coding block are compliant with the maximum transform block size threshold requirements.

According to at least one example, an apparatus for encoding video data is provided. The apparatus includes a memory and a processor implemented in circuitry. The processor is configured to and can obtain a current block of a picture of video data; determine whether at least one of a width of the current block of the picture is greater than a width size threshold and a height of the current block is greater than a height size threshold, the width size threshold corresponding to a width of a data unit and the height size threshold corresponding to a height of the data unit; determine whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the current block is partitioned into rectangular transform block sub-partitions; and generate, based on determining whether the intra-subpartitions mode flag is to be signaled for the current block, an encoded video bitstream including at least the current block.

In another example, a method for encoding video data is provided. The method includes obtaining a current block of a picture of video data; determining whether at least one of a width of the current block of the picture is greater than a width size threshold and a height of the current block is greater than a height size threshold, the width size threshold corresponding to a width of a data unit and the height size threshold corresponding to a height of the data unit; determining whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the current block is partitioned into rectangular transform block sub-partitions; and generating, based on determining whether the intra-subpartitions mode flag is to be signaled for the current block, an encoded video bitstream including at least the current block.

In another example, a non-transitory computer-readable medium is provided that has stored thereon instructions that, when executed by one or more processors, cause the one or more processors to: obtain a current block of a picture of video data; determine whether at least one of a width of the current block of the picture is greater than a width size threshold and a height of the current block is greater than a height size threshold, the width size threshold corresponding to a width of a data unit and the height size threshold corresponding to a height of the data unit; determine whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the current block is partitioned into rectangular transform block subpartitions; and generate, based on determining whether the intra-subpartitions mode flag is to be signaled for the current block, an encoded video bitstream including at least the current block.

In another example, an apparatus for encoding video data is provided. The apparatus includes means for obtaining a current block of a picture of video data; means for determining whether at least one of a width of the current block of the picture is greater than a width size threshold and a height of the current block is greater than a height size threshold, the width size threshold corresponding to a width of a data unit and the height size threshold corresponding to a height of the data unit; means for determining whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the current block is partitioned into rectangular transform block subpartitions; and means for generating, based on determining whether the intra-subpartitions mode flag is to be signaled for the current block, an encoded video bitstream including at least the current block.

In some aspects of the methods, apparatuses, and computer-readable media described above, the width size threshold is equal to the height size threshold.

In some aspects of the methods, apparatuses, and computer-readable media described above, the width size threshold is different than the height size threshold.

In some aspects of the methods, apparatuses, and computer-readable media described above, a value of the intra-subpartitions mode flag being equal to a first value specifies that the current block is partitioned into rectangular transform block subpartitions, and the value of the intra-subpartitions mode flag being equal to a second value specifies that the current block is not partitioned into rectangular transform block subpartitions.

Some aspects of the methods, apparatuses, and computer-readable media described above further include determining the width of the current block is greater than the width size threshold or the height of the current block is greater than the height size threshold; and based on the determination that the width of the current block is greater than the width size threshold or the height of the current block is greater than the height size threshold, determining the value of the intra-subpartitions mode flag for the current block to be equal to the second value.

Some aspects of the methods, apparatuses, and computer-readable media described above further include determining the width of the current block is less than or equal to the width size threshold and the height of the current block is less than or equal to the height size threshold; and based on the determination that the width of the current block is less than or equal to the width size threshold and the height of the current block is less than or equal to the height size threshold, determining to signal the intra-subpartitions mode flag for the current block. For example, the intra-subpartitions mode flag for the current block can be set to be equal to the first value or the second value.

Some aspects of the methods, apparatuses, and computer-readable media described above further include determining the width of the current block is less than or equal to a size threshold and the height of the current block is less than or equal to the size threshold, the size threshold corresponding to a maximum transform block size; and based on the determination that the width of the current block is less than or equal to the size threshold and the height of the current block is less than or equal to the size threshold, determining to signal the intra-subpartitions mode flag for the current block. For example, the intra-subpartitions mode flag for the current block can be set to be equal to the first value or the second value.

Some aspects of the methods, apparatuses, and computer-readable media described above further include determining the width of the current block is less than or equal to a size threshold or the height of the current block is less than or equal to the size threshold, the size threshold corresponding to a maximum transform block size; and based on the determination that the width of the current block is less than or equal to the size threshold or the height of the current block is less than or equal to the size threshold, determining that the value of the intra-subpartitions mode flag for the current block is the second value.

Some aspects of the methods, apparatuses, and computer-readable media described above further include determining the width of the current block is less than or equal to the width size threshold and the height of the current block is less than or equal to the height size threshold; and based on the determination that the width of the current block is less than or equal to the width size threshold and the height of the current block is less than or equal to the height size threshold, determining the value of the intra-subpartitions mode flag for the current block to be equal to the first value.

Some aspects of the methods, apparatuses, and computer-readable media described above further include determining the width of the current block is less than or equal to a size threshold and the height of the current block is less than or equal to the size threshold, the size threshold corresponding to a maximum transform block size; and based on the determination that the width of the current block is less than or equal to the size threshold and the height of the current block is less than or equal to the size threshold, determining that value of the intra-subpartitions mode flag for the current block to be equal to the first value.

Some aspects of the methods, apparatuses, and computer-readable media described above further include determining the width of the current block is less than or equal to a size threshold or the height of the current block is less than or equal to the size threshold, the size threshold corresponding to a maximum transform block size; and based on the determination that the width of the current block is less than or equal to the size threshold or the height of the current block is less than or equal to the size threshold, determining that the value of the intra-subpartitions mode flag for the current block is the second value.

Some aspects of the methods, apparatuses, and computer-readable media described above further include determining the intra-subpartitions mode flag is to be signaled for the current block; and based on the determination that the intra-subpartitions mode flag is to be signaled for the current block, including the intra-subpartitions mode flag for the current block in the encoded video bitstream.

Some aspects of the methods, apparatuses, and computer-readable media described above further include determining that at least one of a width and a height of the current block is greater than a size threshold corresponding to a maximum transform block size; and based on the determination that the width or the height of the current block is greater than the size threshold corresponding to the maximum transform block size, determining a value for an intra-subpartitions split flag for the current block, the intra-subpartitions split flag specifying whether a type of split for partitioning the current block is horizontal or vertical.

Some aspects of the methods, apparatuses, and computer-readable media described above further include determining the width of the current block is greater than the size threshold; and based on the determination that the width of the current block is greater than the size threshold, determining a first split value for the intra-subpartitions split flag, the first split value corresponding to a vertical split type.

Some aspects of the methods, apparatuses, and computer-readable media described above further include determining the height of the current block is greater than the size threshold; and based on the determination that the height of the current block is greater than the size threshold, determining a second split value for the intra-subpartitions split flag, the second split value corresponding to a horizontal split type.

Some aspects of the methods, apparatuses, and computer-readable media described above further include dividing the current block vertically or horizontally into sub-partitions based on the value of the intra-subpartitions split flag for the current block.

In some aspects of the methods, apparatuses, and computer-readable media described above, the current block is an intra-predicted block.

In some aspects of the methods, apparatuses, and computer-readable media described above, the data unit is a Virtual Pipeline Data Unit (VPDU).

In some aspects of the methods, apparatuses, and computer-readable media described above, the data unit is a transform block. In some cases, the width size threshold and the height size threshold are equal to a maximum transform block size.

In another example, a method of decoding video data is provided. The method includes obtaining an encoded video bitstream including video data; determining that an intra-subpartitions split flag is not present in the encoded video bitstream for a current block of video data, the intra-subpartitions split flag specifying whether a type of split for an intra-subpartitions mode used for the current block is horizontal or vertical; determining that at least one of a width and a height of the current block is greater than a size threshold corresponding to a maximum transform block size; and determining a value for the intra-subpartitions split flag for the current block based on whether the width or the height of the current block is greater than the size threshold.

In another example, an apparatus for decoding video data is provided. The apparatus includes a memory and a processor implemented in circuitry. The processor is configured to and can obtain an encoded video bitstream including video data; determine that an intra-subpartitions split flag is not present in the encoded video bitstream for a current block of video data, the intra-subpartitions split flag specifying whether a type of split for an intra-subpartitions mode used for the current block is horizontal or vertical; determine that at least one of a width and a height of the current block is greater than a size threshold corresponding to a maximum transform block size; and determine a value for the intra-subpartitions split flag for the current block based on whether the width or the height of the current block is greater than the size threshold.

In another example, a non-transitory computer-readable medium is provided that has stored thereon instructions that, when executed by one or more processors, cause the one or more processors to: obtain an encoded video bitstream including video data; determine that an intra-subpartitions split flag is not present in the encoded video bitstream for a current block of video data, the intra-subpartitions split flag specifying whether a type of split for an intra-subpartitions mode used for the current block is horizontal or vertical; determine that at least one of a width and a height of the current block is greater than a size threshold corresponding to a maximum transform block size; and determine a value for the intra-subpartitions split flag for the current block based on whether the width or the height of the current block is greater than the size threshold.

In another example, an apparatus for decoding video data is provided. The apparatus includes means for obtaining an encoded video bitstream including video data; means for determining that an intra-subpartitions split flag is not present in the encoded video bitstream for a current block of video data, the intra-subpartitions split flag specifying whether a type of split for an intra-subpartitions mode used for the current block is horizontal or vertical; means for determining that at least one of a width and a height of the current block is greater than a size threshold corresponding to a maximum transform block size; and means for determining a value for the intra-subpartitions split flag for the current block based on whether the width or the height of the current block is greater than the size threshold Some aspects of the methods, apparatuses, and computer-readable media described above further include determining an intra-subpartitions mode flag is enabled for the current block; and determining that the intra-subpartitions split flag is not present in the encoded video bitstream based on the determination that the intra-subpartitions mode flag is enabled for the current block, wherein the current block is partitioned into rectangular transform block subpartitions using the intra-subpartitions mode based on the intra-subpartitions mode flag being enabled for the current block.

Some aspects of the methods, apparatuses, and computer-readable media described above further include determining the width of the current block is greater than the size threshold; and based on the determination that the width of the current block is greater than the size threshold, determining a first split value for the intra-subpartitions split flag, the first split value corresponding to a vertical split type.

Some aspects of the methods, apparatuses, and computer-readable media described above further include splitting the current block into two or more sub-blocks using the vertical split type, wherein respective widths of each of the two or more sub-blocks are smaller than the width of the current block based on the vertical split type.

Some aspects of the methods, apparatuses, and computer-readable media described above further include determining the height of the current block is greater than the size threshold; and based on the determination that the height of the current block is greater than the size threshold, determining a second split value for the intra-subpartitions split flag, the second split value corresponding to a horizontal split type.

Some aspects of the methods, apparatuses, and computer-readable media described above further include splitting the current block into two or more sub-blocks using the horizontal split type, wherein respective heights of each of the two or more sub-blocks are smaller than the height of the current block based on the horizontal split type.

Some aspects of the methods, apparatuses, and computer-readable media described above further include determining that an intra-subpartitions mode flag for enabling the intra-subpartitions mode for a second block of the video data is not present in the encoded video bitstream; and determining a mode value of the intra-subpartitions mode flag for the second block based on the intra-subpartitions mode flag not being present in the encoded video bitstream for the second block.

In some aspects of the methods, apparatuses, and computer-readable media described above, the intra-subpartitions mode flag not being present in the encoded video bitstream for the second block is indicative of at least one of a width of the second block being greater than a width size threshold or a height of the second block being greater than a height size threshold, the width size threshold corresponding to a width of a data unit and the height size threshold corresponding to a height of the data unit.

In some aspects of the methods, apparatuses, and computer-readable media described above, the width size threshold is equal to the height size threshold.

In some aspects of the methods, apparatuses, and computer-readable media described above, the width size threshold is not equal to the height size threshold.

In some aspects of the methods, apparatuses, and computer-readable media described above, the data unit is a Virtual Pipeline Data Unit (VPDU).

In some aspects of the methods, apparatuses, and computer-readable media described above, the data unit is a transform block. In some cases, the width size threshold and the height size threshold are equal to a maximum transform block size.

In some aspects of the methods, apparatuses, and computer-readable media described above, the current block is an intra-predicted block.

Some aspects of the methods, apparatuses, and computer-readable media described above further include performing block-based partitioning of a block of video data to generate one or more coding blocks including the current block; determining the intra-subpartitions mode is enabled for the current block; and based on determining the intra-subpartitions mode is enabled for the current block, partitioning the current block into two or more sub-blocks using the intra-subpartitions mode.

Some aspects of the methods, apparatuses, and computer-readable media described above further include reconstructing the two or more sub-blocks by applying respective two or more residual values to the two or more sub-blocks.

In some aspects of the methods, apparatuses, and computer-readable media described above, the apparatus comprises a mobile device with a camera for capturing one or more pictures.

Some aspects of the methods, apparatuses, and computer-readable media described above, further include a display for displaying one or more pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 7 is a flowchart illustrating an example of a process of processing video data, in accordance with some embodiments;

FIG. 8 is a flowchart illustrating an example of a process of processing video data, in accordance with some embodiments;

FIG. 9 is a flowchart illustrating an example of a process of processing video data, in accordance with some embodiments;

DETAILED DESCRIPTION

Figure 1:
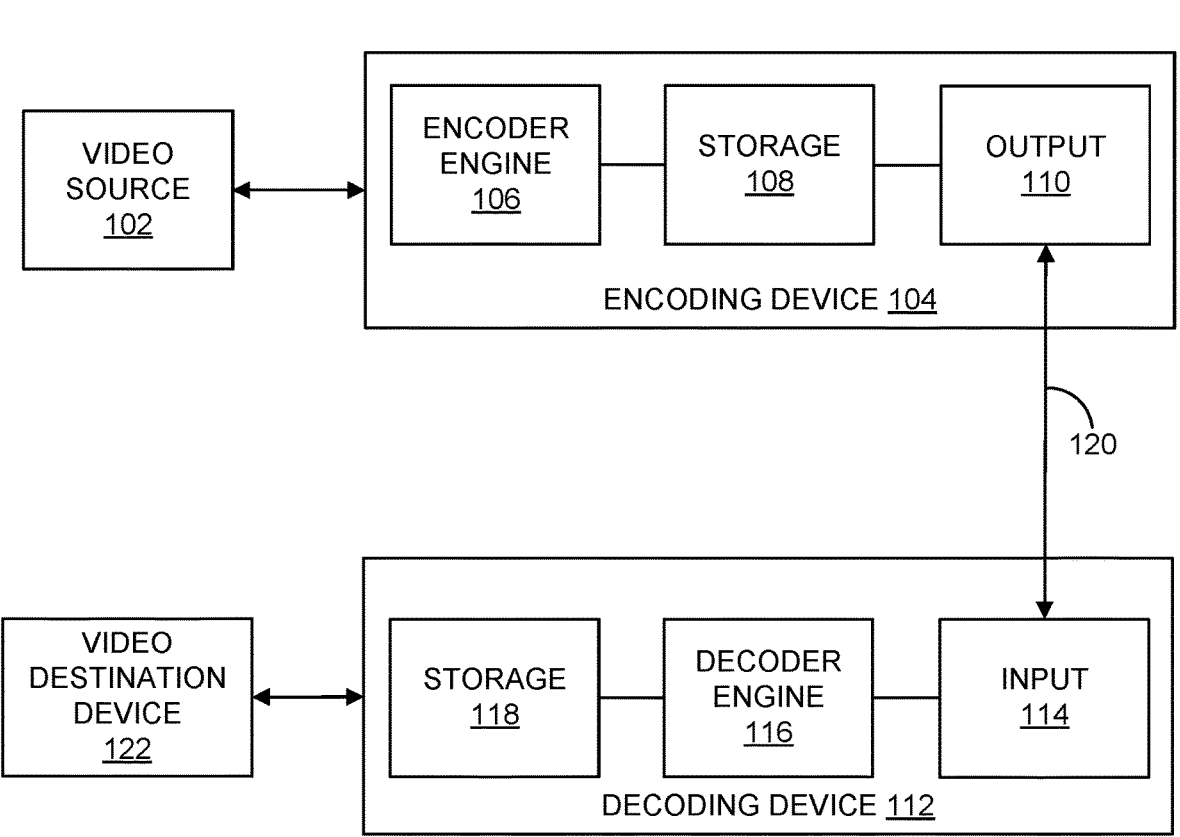
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Systems and methods are described herein for improving the use of an intra sub-partitioning or intra-subpartitioning (ISP) mode for splitting coding blocks of video data into sub-blocks, subject to one or more restrictions and/or constraints. In some examples, a decision of whether to perform an ISP mode for a coding block is based on size constraints. The size constraints can be based on one or more size thresholds defined using a size of a data unit. For example, as described in more detail below, a width size threshold can be defined as a width of a data unit and a height size threshold can be defined as a height of the data unit. In some cases, a single threshold can be defined (e.g., when the width and height of the data unit are equal). The data unit can include a Virtual Pipeline Data Unit (VPDU), a transform block, or other data unit or block. In one illustrative example, VPDU constraints are defined herein that prevent the ISP mode from being enabled for coding blocks that cross Virtual Pipeline Data Unit (VPDU) boundaries. Such VPDU constraints can improve the processing efficiencies of VPDUs by ensuring that sub-blocks obtained from splitting a coding block using ISP are not processed separately in different VPDUs. In some examples, the VPDU constraints may be applied by an encoder, where an ISP mode flag is not signaled for a coding block in or with an encoded video bitstream when the VPDU constraints are violated by the coding block. In such examples, based on the ISP mode flag not being signaled in or with the encoded video bitstream, a value of the ISP mode flag can be inferred by a decoder to be a value (e.g., a value of 0) that indicates that the ISP mode is not enabled for the coding block.

A split flag (in some cases referred to herein as an intra-subpartitions split flag) can be signaled in an encoded video bitstream and used to determine an ISP split type (e.g., a horizontal type or vertical type) to perform for a coding block for which the ISP mode is enabled. In example aspects, improved techniques are provided for determining and signaling the split flag. For example, the optimal ISP split type can be determined for a coding block based on the particular dimensions of the coding block relative to a maximum transform block size, which can avoid an undesirable split type that may result according existing implementations. In one example, when the ISP mode is enabled for a coding block, a determination of an ISP split type (e.g., a horizontal type or vertical type) to perform for the coding block may be based on a comparison of the width and/or height of the coding block to size thresholds corresponding to a maximum transform block size. For instance, a value of the split flag for a coding block can be determined based on a comparison of the width and/or height of the coding block to the maximum transform block size thresholds, and the value of the split flag can be used to determine the ISP split type (e.g., as horizontal or vertical).

In some examples, a partition structure for the ISP mode can be provided to ensure that dimensions of sub-blocks obtained by partitioning a coding block do not violate a size threshold, such as the maximum transform block size. In some examples, a recursive tree structure is provided for ensuring that the sub-partition split type is determined to be horizontal or vertical in a manner which leads to sizes of the sub-blocks being compliant with the maximum transform block size threshold requirements. In some examples, the number of sub-blocks that a coding block is split into is determined such that the dimensions of the sub-blocks are compliant with the maximum transform block size threshold requirements. In some examples, enabling the ISP mode is adjusted to ensure that the dimensions of sub-blocks obtained from splitting a coding block are compliant with the maximum transform block size threshold requirements.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., $\frac{1}{4}$-pixel, $\frac{1}{2}$-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 10. An example of specific details of the decoding device 112 is described below with reference to FIG. 11.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

As previously described, various prediction modes may be used in a video coding process, including intra-prediction and inter-prediction. As previously explained, a video coder can partition a coding block such as a CTU according to a tree structure, such as a quadtree-binary tree (QTBT) structure or Multi-Type Tree (MTT) structure to yield two or more sub-blocks, where the two or more sub-blocks can be independently coded. For example, the different sub-blocks resulting from a coding block partitioned using a tree structure can be coded with planar mode, DC mode, etc., without inheriting a common prediction mode requirement for the different sub-blocks.

In some examples, an intra sub-partition or intra-subpartition (ISP) mode can be used as a coding tool for splitting a coding block into two or more partitions The ISP mode can be used in addition to the regular or tree partitioning structures in some cases. For example, a picture can be split into coding units or blocks using a QTBT structure or MTT structure, and a coding unit or coding block can be further split using ISP. In the ISP mode, the two or more partitions resulting from splitting the coding block share the same intra-prediction mode. For example, the two or more partitions of a coding block can be encoded or decoded separately (e.g., in a sequential order) but the same intra-prediction mode is used for each of the two or more partitions. For example, in some implementations, if the ISP mode is enabled or chosen to be applied for a coding block, then the coding block can be partitioned and the same intra-prediction mode can be applied to each of the partitions.

In various examples, the ISP mode can be used to divide a coding block such as a luma intra-predicted block into two or four ISP partitions (or ISP sub-blocks or sub-blocks) depending on the size or dimensions of the coding block. In some examples, the division can be vertical or horizontal based on the dimensions of the coding block. The number of ISP sub-blocks that the coding block is split into can be based on the number of samples that would be present in the ISP sub-blocks. For example, in some implementations, an ISP sub-block may be required to have a minimum number of samples, such as 16 samples or other number of samples. Accordingly, if dividing a block into four ISP sub-blocks can result in each of the four sub-blocks having at least the minimum number of samples (e.g., 16 samples), then the ISP mode may decide to split the block into four ISP sub-blocks. However, if partitioning the block into four ISP sub-blocks may not result in each of the four sub-blocks having at least the minimum number of samples (e.g., 16 samples), then the ISP mode may split the block into two ISP sub-blocks if each of the two sub-blocks can have at least the minimum number of samples (e.g., 16 samples). ISP sub-blocks will be referred to hereinafter as sub-blocks, which as noted above, can be different than the sub-blocks that may be generated using a regular or tree partitioning structures (e.g., using a QTBT structure or MTT structure).

Figure 2:
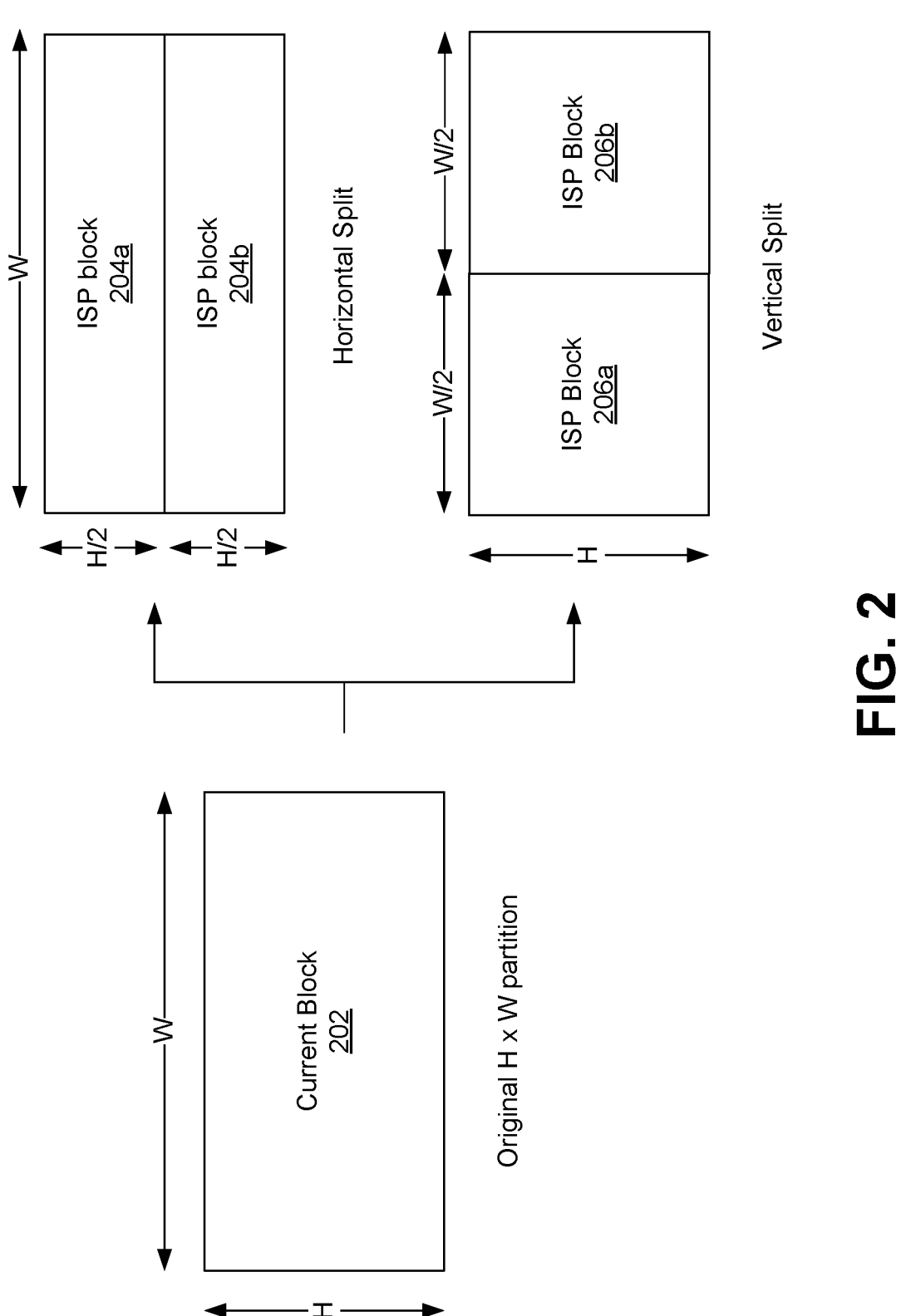
FIG. 2 is a conceptual diagram illustrating an example of a division of blocks, in accordance with some examples.

FIG. 2 is a block diagram which illustrates an example of splitting a coding block into sub-blocks. A current block 202 can be split in an ISP mode into a number of sub-blocks. The sub-blocks resulting from splitting a block using ISP are also referred to as ISP sub-block or ISP blocks. The current block 202 is shown to have dimensions of width W and height H. In an example, the current block 202 can have a number of samples corresponding to H×W. For example, the current block 202 of dimensions 4×8 can have 32 samples. If the current block 202 is split into four sub-blocks using the ISP mode, then each of the four resultant sub-blocks would have one-fourth of 32 samples, i.e., 8 samples each. With a minimum number of samples being 16 as noted above, such a division would violate the requirement for each sub-block to have at least 16 samples. Therefore, for the values of H and W noted above, the current block 202 is split into two sub-blocks, each having one-half of 32 samples, i.e., 16 samples, satisfying the minimum sample requirement. It is noted that for similar reasons, a block of dimensions 8×4 may also be divided into two sub-blocks to satisfy the minimum sample requirement of 16 samples in each sub-block.

As shown in FIG. 2, a horizontal ISP split of the current block 202 can result in the two ISP blocks 204a and 204b, each of the same width (W) as that of the current block 202 and half the height (H/2) of the current block 202. Similarly, a vertical ISP split of the current block 202 can result in the two ISP blocks 206a and 206b, each of the same height (H) as that of the current block 202 and half the width (W/2) of the current block 202.

Figure 3:
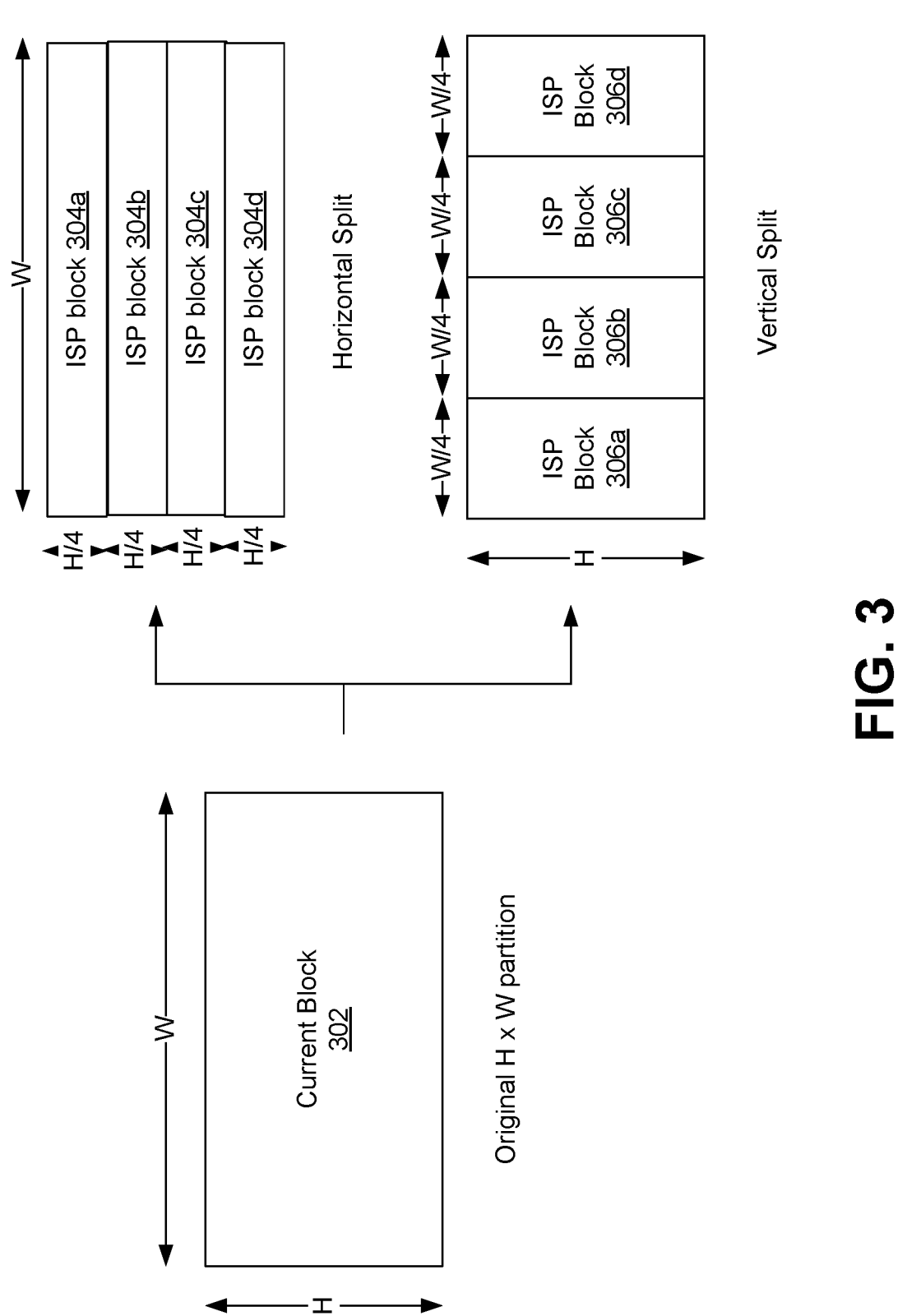
FIG. 3 is a conceptual diagram illustrating another example of a division of blocks, in accordance with some examples.

FIG. 3 is a block diagram which illustrates an example of splitting a coding block into four sub-blocks. A current block 302 can be split in an ISP mode into four sub-blocks or ISP blocks. The current block 302 is shown to have dimensions of width W and height H. The example of splitting the current block 302 into four sub-blocks may be applicable for dimensions of the current block 302 which, when split into four sub-blocks can yield at least 16 samples in each of the resultant sub-blocks. For example, with a minimum number of samples being 16 for each sub-block, the current block 302 can have dimensions other than (e.g., greater than) 4×8 or 8×4 noted above with respect to FIG. 2. A dimension of 4×4 for the current block 302, which would be the smallest allowable size for coding blocks in some implementations may also be excluded from splitting into sub-blocks using the ISP mode.

In an example, a horizontal ISP split of the current block 302 can result in the four ISP blocks 304*a*, 304*b*, 304*c*, and 304*d*, each of the same width (W) as that of the current block 202 and one-fourth the height (H/4) of the current block 202. Similarly, a vertical ISP split of the current block 302 can result in the four ISP blocks 306*a*, 306*b*, 306*c*, and 306*d*, each of the same height (H) as that of the current block 202 and one-fourth the width (W/4) of the current block 302.

In example implementations of the ISP mode, once the number of partitions (e.g., two or four) and the ISP split type indicating the type of partition (e.g., horizontal or vertical split) have been determined for a block, the current block or coding block may be split accordingly and the resultant ISP sub-blocks may be processed in order. For example, the two or more sub-blocks resulting from applying an ISP mode to a coding block can be processed sequentially. Processing the sub-blocks can include predicting each sub-block using intra-prediction, applying transform coding, and then reconstructing the sub-blocks as discussed previously.

In some implementations, various syntax elements can be used for coding and signaling the ISP mode. A syntax table for coding units using the ISP mode is shown in Table 2 and discussed further below. According to example implementations, one bit for a coding block (in some cases referred to as intra_subpartitions_mode_flag[x0][y0]) can be used to signal whether the coding block is split into ISP blocks. A second bit (in some cases referred to as intra_subpartitions_split_flag[x0][y0]) can be used to indicate the ISP split type that will be performed for the coding block, e.g., whether the split type is horizontal or vertical.

In some examples, different classes of processing orders may be used for processing the ISP blocks obtained by splitting a coding block using the ISP mode. The processing orders can be based on the intra-prediction mode and the split type used for the coding block. For example, two different classes of processing orders, referred to as normal order and reversed order, can be used in processing the two or more ISP blocks obtained from splitting a coding block.

In the normal order, the first sub-partition to be processed is the sub-partition containing the top-left sample of the coding block and then continuing downwards (in the case of a horizontal split) or rightwards (in the case of a vertical split). For example, in FIG. 2, the normal processing order for the horizontal split can include processing the ISP block 204*a* first and then proceeding downwards to process the ISP block 204*b*. Similarly, in FIG. 2, the normal processing order for the vertical split can include processing the ISP block 206*a* first and then proceeding rightwards to process the ISP block 206*b*. In FIG. 3, the normal processing order for the horizontal split can include processing the ISP block 304*a* first and then proceeding downwards to process the ISP blocks 304*b*, 304*c*, and 304*d* in sequential order. Similarly, in FIG. 3, the normal processing order for the vertical split can include processing the ISP block 306*a* first and then proceeding rightwards to process the ISP blocks 306*b*, 306*c*, and 306*d* in sequential order.

The reverse processing order can include starting with the sub-partition containing the bottom-left sample of the coding block and continuing upwards (in the case of a horizontal split) or starting with the sub-partition containing the top-right sample of the coding block and continuing leftwards (in the case of the vertical split). For example, in FIG. 2, the reverse processing order for the horizontal split can include processing the ISP block 204*b* first and then proceeding upwards to process the ISP block 204*a*. Similarly, in FIG. 2, the reverse processing order for the vertical split can include processing the ISP block 206*b* first and then proceeding leftwards to process the ISP block 206*a*. In FIG. 3, the reverse processing order for the horizontal split can include processing the ISP block 304*d* first and then proceeding upwards to process the ISP blocks 304*c*, 304*b*, and 304*a* in sequential order. Similarly, in FIG. 3, the reverse processing order for the vertical split can include processing the ISP block 306*d* first and then proceeding leftwards to process the ISP blocks 306*c*, 306*b*, and 306*a* in sequential order.

A variation of ISP that uses only the normal processing order is used in JVET Working Draft 4 (WD4, available at http://phenix.it-sudparis.eu/jvet/doc_end_user/documents/13_Marrakech/wg11/JVET-M1001-v1.zip), which is hereby incorporated by reference in its entirety and for all purposes. It is to be noted that the terms sub-block (as used with respect to ISP), sub-partitions (as used with respect to ISP), and ISP blocks are used interchangeably herein, and all of these terms refer to the blocks obtained by partitioning a coding block using the ISP mode.

Examples of syntax and semantics associated with the ISP mode in JVET WD4 are shown in Table 2 below. The syntax emphasized using italicized text corresponds to ISP mode for a coding unit located at (x, y) coordinates [x0][y0] of a picture. A reference line index selected by an encoder for a reference line candidate to predict the coding unit is indicated by the syntax element intra_luma_ref_idx. The syntax elements cbWidth and cbHeight correspond to width and height dimensions of the coding unit (e.g., the width W and height H, as shown in FIG. 2 and FIG. 3 for the respective current blocks 202 and 203). A variable MaxTbSizeY refers to a maximum transform block size and is used as a size threshold for the cbWidth and cbHeight dimensions. As previously mentioned, intra_subpartitions_mode_flag[x0][y0] is a syntax element used to signal whether the coding unit is split into sub-blocks (or ISP blocks) using the ISP mode. The syntax element intra_subpartitions_split_flag [x0][y0] is used to indicate the ISP split type (the type of split that will be performed), for example, whether the coding block is split using a horizontal split or a vertical split.

TABLE 2

| Syntax table of coding unit | |
|---|---|
| | Descriptor |
| coding_unit( x0, y0, cbWidth, cbHeight, treeType ) { | |
| ... | |
| } else { | |
| if( treeType = = SINGLE_TREE ∣ ∣ treeType = = DUAL_TREE_LUMA ) { | |
| if( ( y0 % CtbSizeY ) > 0 ) | |
| intra_luma_ref_idx[ x0 ][ y0 ] | ae(v) |
| *if ( intra_luma_ref_idx[ x0 ][ y0 ] = = 0 &&* | |
| *( cbWidth <= MaxTbSizeY ∣ ∣ cbHeight <=* | |
| *MaxTbSizeY ) &&* | |
| *( cbWidth * cbHeight > MinTbSizeY ** | |
| *MinTbSizeY ))* | |
| *intra_subpartitions_mode_flag[ x0 ][ y0 ]* | ae(v) |
| *if(intra_subpartitions_mode_flag[ x0 ][ y0 ] = =* | |
| *1 &&* | |

TABLE 2-continued

| Syntax table of coding unit | |
| --- | --- |
| | Descriptor |
| cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] == 0 && intra_subpartitions_mode_flag[ x0 ][ y0 ] == 0 ) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| ... | |

As seen from Table 2, the intra_subpartitions_mode_flag [x0][y0] is signaled when at least the condition (cbWidth<=MaxTbSizeY‖cbHeight<=MaxTbSizeY) is satisfied, i.e., when either the cbWidth or the cbHeight (or both) are less than the MaxTbSizeY. On the other hand, the intra_subpartitions_split_flag[x0][y0] is signaled when at least the condition cbWidth<=MaxTbSizeY && cbHeight<=MaxTbSizeY is satisfied, i.e., both cbWidth and the cbHeight are less than the MaxTbSizeY. Thus, in implementations which use the semantics specified in Table 2, when one of cbWidth or the cbHeight, but not both, are greater than MaxTbSizeY, only the intra_subpartitions_mode_flag[x0][y0] is signaled, but the intra_subpartitions_split_flag[x0][y0] is not signaled. As will be further explained below, when intra_subpartitions_mode_flag[x0] [y0] is not signaled, the value of the intra_subpartitions_mode_flag[x0][y0] is inferred to be equal to 0; and similarly, when intra_subpartitions_split_flag[x0][y0] is not signaled, the value of the intra_subpartitions_split_flag [x0][y0] is inferred to be equal to 0.

In addition to the intra_subpartitions_mode_flag[x0][y0] and intra_subpartitions_split_flag[x0][y0], a variable IntraSubPartitionsSplitType is defined, which specifies the type of split used for the current luma coding block. The values for IntraSubPartitionsSplitType and corresponding name associations are illustrated Table 3 below.

TABLE 3

| Name association for IntraSubPartitionsSplitType | |
| --- | --- |
| IntraSubPartitionsSplitType | Name of IntraSubPartitionsSplitType |
| 0 | ISP_NO_SPLIT |
| 1 | ISP_HOR_SPLIT |
| 2 | ISP_VER_SPLIT |

Figure 4:
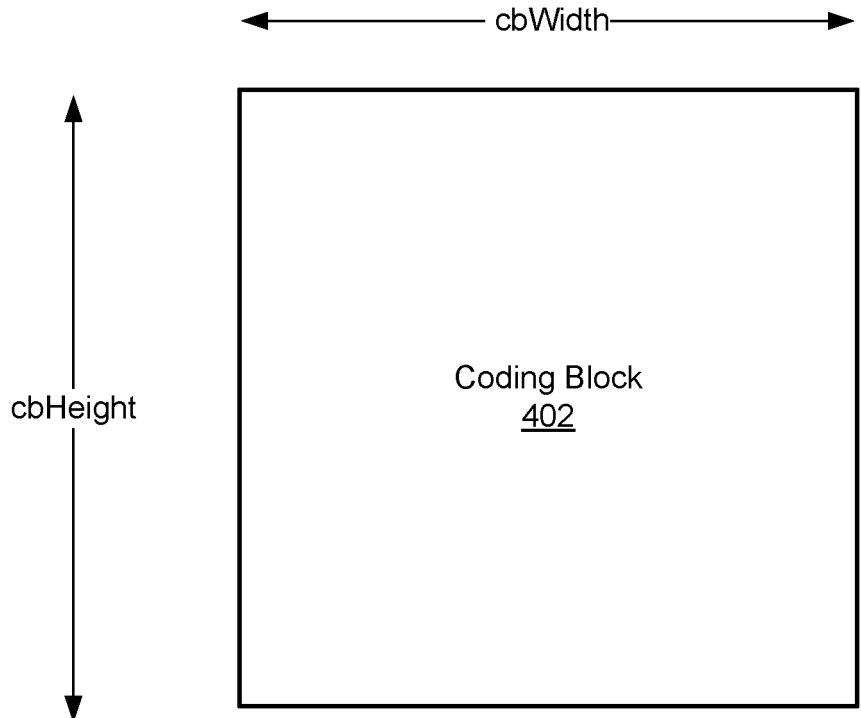
FIG. 4 is a conceptual diagram illustrating an example of a coding block, in accordance with some examples.

As seen from Table 3, IntraSubPartitionsSplitType is a variable used to indicate whether there is no ISP split (IntraSubPartitionsSplitType=0), whether a horizontal ISP split is to be applied (IntraSubPartitionsSplitType=1), or whether a vertical ISP split is to be applied (IntraSubPartitionsSplitType=2). When there is no ISP split (IntraSubPartitionsSplitType=0), the regular transform tree parsing structures are used for partitioning blocks, e.g., according to QTBT, MTT, etc. For the cases of the horizontal or vertical ISP split, a variable NumIntraSubPartitions is used to indicate the number of sub-blocks or ISP blocks (e.g., 2 ISP blocks as in FIG. 2 or 4 ISP blocks as in FIG. 3). The corresponding number of sub-blocks are successively parsed for the transform unit corresponding to the coding unit. Table 4 below provides the syntax of for a transform tree using the ISP mode.

TABLE 4

| Syntax table of transform tree | |
| --- | --- |
| | Descriptor |
| transform_tree( x0, y0, tbWidth, tbHeight, treeType) { | |
| InferTuCbfLuma = 1 | |
| if( IntraSubPartSplitType == NO_ISP_SPLIT ) { | |
| if( tbWidth > MaxTbSizeY ‖ tbHeight > MaxTbSizeY ) { | |
| trafoWidth = ( tbWidth > MaxTbSizeY ) ? (tbWidth / 2) : tbWidth | |
| trafoHeight = ( tbHeight > MaxTbSizeY ) ? (tbHeight / 2) : tbHeight | |
| transform_tree( x0, y0, trafoWidth, trafoHeight ) | |
| if( tbWidth > MaxTbSizeY ) | |
| transform_tree( x0 + trafoWidth, y0, trafoWidth, trafoHeight, treeType ) | |
| if( tbHeight > MaxTbSizeY ) | |
| transform_tree( x0, y0 + trafoHeight, trafoWidth, trafoHeight, treeType ) | |
| if( tbWidth > MaxTbSizeY && tbHeight > MaxTbSizeY) | |
| transform_tree( x0 + trafoWidth, y0 + trafoHeight, trafoWidth, trafoHeight, treeType ) | |
| } else { | |
| transform_unit( x0, y0, tbWidth, tbHeight, treeType, 0 ) | |
| } | |
| } else if( IntraSubPartitionsSplitType == ISP_HOR_SPLIT ) { | |
| trafoHeight = tbHeight / NumIntraSubPartitions | |
| for(partIdx = 0; partIdx < NumIntraSubPartitions; partIdx++ ) | |
| transform_unit(x0, y0 + trafoHeight * partIdx, tbWidth, trafoHeight, treeType, partIdx ) | |
| } else if( IntraSubPartitionsSplitType == ISP_VER_SPLIT ) { | |
| trafoWidth = tbWidth / NumIntraSubPartitions | |
| for(partIdx = 0; partIdx < NumIntraSubPartitions; partIdx++ ) | |
| transform_unit(x0 + trafoWidth * partIdx, y0, trafoWidth, tbHeight, treeType, partIdx ) | |
| } | |
| } | |

Based on the above description of the syntax elements and variables associated with the ISP mode, the following semantics may be used for applying ISP to a coding unit:

intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0] [y0] equal to 0 specifies that the current intra coding unit is not partitioned into rectangular transform block subpartitions.

When intra_subpartitions_mode_flag[x0][y0] is not present, it is inferred to be equal to 0. intra_subpartitions_split_flag[x0][y0] specifies whether the intra subpartitions split type is horizontal or vertical. When intra_subpartitions_split_flag[x0][y0] is not present, it is inferred to be equal to 0.

The variable IntraSubPartitionsSplitType specifies the type of split used for the current luma coding block as illustrated in Table 3. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

As seen from the above semantics, a value of the intra_subpartitions_mode_flag[x0][y0] equal to 1 can be used to specify that a coding unit is partitioned into a number of sub-blocks indicated by the variable NumIntraSubPartitions

[x0][y0], where these sub-blocks are rectangular transform block sub-partitions such as the ISP blocks shown in FIG. 2 and FIG. 3. A value of the intra_subpartitions_mode_flag [x0][y0] equal to 0 can be used to specify that the coding unit is not partitioned into rectangular transform block sub-partitions using an ISP mode. In some implementations, when the intra_subpartitions_mode_flag[x0][y0] is not present for the coding unit, the value of the intra_subpartition-s_mode_flag[x0][y0] for the coding unit is inferred to be equal to 0.

As previously described, the intra_subpartitions_split_flag[x0][y0] can be used to specify whether the ISP split type is horizontal or vertical. In some implementations, when the intra_subpartitions_split_flag[x0][y0] is not present for a coding unit, the value of the intra_subpartition-s_split_flag[x0][y0] is inferred to be equal to 0.

The variable IntraSubPartitionsSplitType specifies the type of split used for the coding block, as described with reference to Table 3 above. The value of this variable IntraSubPartitionsSplitType can be derived as follows: if the value of the intra_subpartitions_mode_flag[x0][y0] is equal to 0, then IntraSubPartitionsSplitType is set to be equal to 0; otherwise, the value of the IntraSubPartitionsSplitType is set to be equal to 1+intra_subpartitions_split_flag [x0][y0].

In some implementations, the variable NumIntraSubPartitions which is used to specify the number of sub-blocks a coding unit is divided into can be derived as follows: if the variable IntraSubPartitionsSplitType has a value equal to 0, indicating ISP_NO_SPLIT, then the value of the variable NumIntraSubPartitions is set equal to 1 (which is a default value indicating that there is no ISP applied to the coding unit). Otherwise, if the variable IntraSubPartitionsSplitType has a value equal to 1 (horizontal split ISP_HOR_SPLIT) or 2 (vertical split ISP_VER_SPLIT), the value of the variable NumIntraSubPartitions is set equal to 2 or 4 based on the dimensions of the coding unit or current block as explained with reference to FIG. 2 and FIG. 3. For example, if the current block 202 is a 4×8 block (cbWidth is equal to 4 and cbHeight is equal to 8) or an 8×4 block (cbWidth is equal to 8 and cbHeight is equal to 4), then the NumIntraSubParti-tions is set to 2, to implement splitting the current block 202 into two ISP blocks which have the minimum number of 16 samples each, based on a horizontal or a vertical split which can be indicated by the variable IntraSubPartitionsSplit-Type. On the other hand, if the dimensions of the coding unit are other than (greater than) the 8×4, 4×8, and 4×4 block sizes, then the NumIntraSubPartitions is set equal to 4 (for example, as discussed with reference to splitting the current block 302 of FIG. 3 into four ISP blocks based on a horizontal or a vertical split which can be indicated by the variable IntraSubPartitionsSplitType).

Several problems exist in implementations of the ISP mode based on the above-noted semantics and syntax as described with reference to Tables 2-4. In one example, (e.g., based on VVC), when the width (cbWidth) or the height (cbHeight) of a luma coding block (CB) is larger than the maximum transform block size (denoted as MaxTbSizeY, with Y indicating luma samples), the coding block is split into two or more transform units as discussed above with reference to the transform tree syntax structure of Table 4. It is noted that, some implementations can include a fixed value for MaxTbSizeY (e.g., JVET WD4 specifies a fixed value of 64 for MaxTbSizeY). It is possible for some implementations or future standards to allow the value of MaxTbSizeY to be another fixed value (e.g., a value of 32 or other value) or to be a variable. In some examples, the value of MaxTbSizeY may be signaled in the bitstream, or may be derived from other syntax elements in the bitstream. Accordingly, the comparisons of cbWidth and cbHeight to the MaxTbSizeY in determining the signaling of the above-noted syntax elements can be based on the fixed or variable value of the MaxTbSizeY.

As previously mentioned, a mode flag for the ISP mode, the intra_subpartitions_mode_flag, is signaled for a coding block when the coding block width (cbWidth) or the coding block height (cbHeight) is less than or equal to the maximum transform block size, MaxTbSizeY, or if both the cbWidth and the cbHeight are less than or equal to MaxTbSizeY. Accordingly, in examples where one of the cbWidth or the cbHeight is greater than MaxTbSizeY and the other is smaller, the intra_subpartitions_mode_flag is signaled (e.g., with a value indicating that the ISP mode is enabled for the coding block, such as with a value of 1). In such implementations (referring back to the syntax for coding units shown in Table 2), since one of the cbWidth or the cbHeight is greater than MaxTbSizeY, the syntax element for the split flag, intra_subpartitions_split_flag, is not signaled.

When the intra_subpartitions_split_flag is not signaled for a coding block, the intra_subpartitions_split_flag is inferred to be equal to 0 according to the existing implementations. From the semantics provided above, the split type for the coding block is provided by the value of the variable, IntraSubPartitionsSplitType, which is set to be equal to 1+intra_subpartitions_split_flag. Thus, when intra_subpar-titions_split_flag is inferred to be 0, the variable IntraSu-bPartitionsSplitType is derived to be equal to 1. From Table 3 showing the name associations for the IntraSubPartition-sSplitType, the IntraSubPartitionsSplitType being of value 1 corresponds to a horizontal split (ISP_HOR_SPLIT). As noted previously, this derivation of the IntraSubPartition-sSplitType being equal to 1 (corresponding to the horizontal split) is for the case when one of the cbWidth or the cbHeight is larger than MaxTbSizeY and the other is smaller the MaxTbSizeY. Notably, this derivation of the split type being a horizontal split is the same whether cbWidth is greater than MaxTbSizeY (and cbHeight is less than MaxTbSizeY) or whether cbHeight is greater than MaxTb-SizeY (and cbWidth is less than MaxTbSizeY). The value of the IntraSubPartitionsSplitType being derived to be equal to 1 irrespective of which one of the two dimensions (the cbWidth or the cbHeight) of the coding block is greater than the MaxTbSizeY can lead to undesirable effects.

For example, when the intra_subpartitions_mode_flag is equal to 1 and either the cbWidth or the cbHeight of the coding block is greater than the MaxTbSizeY, the split type being always derived to be horizontal may not be the optimal selection of split type for some values of cbWidth or the cbHeight. To illustrate, an example is considered where the MaxTbSizeY is equal to 32, cbWidth is equal to 64, and cbHeight is equal to 32. In this example, the shape of the coding block would resemble the shape of the current block 202 shown in FIG. 2, where the width W is larger than the height H. In such cases, an ISP vertical split would be an optimal choice which can result in sub-blocks (resembling the shapes of the ISP blocks 206a and 206b) whose indi-vidual widths and heights are each less than or equal to the MaxTbSizeY. For example, an ISP vertical split of the coding block of cbWidth equal to 64 and cbHeight equal to 32 into two sub-partitions would result in two sub-blocks, each of width equal to 32 and height equal to 32, where the width and height are both equal to the MaxTbSizeY of 32. However, an ISP horizontal split will be inferred in the current implementations as explained above, based on the intra_subpartitions_split_flag being inferred to a value of 0 and correspondingly the IntraSubPartitionsSplitType being derived to be equal to 1. An ISP horizontal split in the example of the coding block of cbWidth equal to 64 and cbHeight equal to 32 into two sub-partitions would result in two sub-blocks, each of width equal to 64 and height equal to 16 (similar to the shapes of the ISP blocks 204a and 204b), where the heights of both sub blocks would violate the requirement of being greater than the MaxTbSizeY of 32. Accordingly, there is a need for solutions which can overcome the above undesirable outcomes associated with inferring a horizontal split decision irrespective of the specific values of cbWidth and cbHeight of the coding block.

Another problem in existing implementations of the ISP mode can correspond to one or more dimensions of sub-blocks obtained by splitting a coding block. Another illustrative example is considered to explain problems associated with the width of a sub-block being greater than a maximum size threshold. In such an example, the following are assumed for a coding block: MaxTbSizeY is equal to 16, cbWidth is equal to 32, and cbHeight is equal to 64. As previously described, this combination of values would result in both the cbWidth and the cbHeight being greater than the MaxTbSizeY, which would lead to a decision to enable the ISP mode for splitting the coding block. Since at least one of cbWidth and the cbHeight (in fact both cbWidth and the cbHeight in this case) is greater than the MaxTbSizeY, the intra_subpartitions_split_flag is not signaled and therefore inferred to be equal to 0 in the current implementations, resulting in the IntraSubPartitionsSplitType being derived as 1, corresponding to an ISP horizontal split for the coding block. The number of sub-partitions in this case can be 4, given the block dimensions as previously explained, thus the NumIntraSubPartitions being derived as 4. The four resultant sub-blocks obtained from a horizontal split (similar to the example of FIG. 3 for obtaining four ISP blocks 304a-304d by splitting the current block 302 using a horizontal split) would each have a width of 32 and a height of 16. Thus, the width of each sub-block being 32 would mean that each of the sub-blocks has a width which is larger than the MaxTbSizeY of 16. As explained previously, it is undesirable to have sub-blocks of width larger than the maximum transform block size MaxTbSizeY. Correspondingly, there is also a need for ISP solutions where the width and height dimensions of sub-blocks obtained by applying an ISP split to a coding block do not exceed the size threshold of the maximum transform block size MaxTbSizeY.

Yet another problem associated with existing implementations pertains to the use of the ISP mode in encoder or decoder designs which utilize Virtual Pipeline Data Units (VPDUs). VPDUs are non-overlapping cells in a picture or video frame. For example, VPDUs can be non-overlapping M×M-luma(L)/N×N-chroma(C) units in a picture. In some examples of hardware decoding processes, consecutive VPDUs can be processed in parallel by multiple processing/decoding pipeline stages (e.g., different decoding pipeline stages process different VPDUs simultaneously). To support parallel processing, each VPDU may include coding units which can be processed independently. For example, processing stages such as reconstruction, transform, and prediction can be performed in different pipeline stages of processing a coding unit using the VPDUs. In some cases, a VPDU size can be roughly proportional to the buffer size in some pipelines. For instance, a VPDU size can be set to the size of a transform block (TB) size. In some examples, only a subset of the processing stages (such as transform or inverse transform) of VPDUs may be processed independently.

In VVC, design choices for VPDUs include sizes of 64×64 luma samples, where the maximum transform block size MaxTbSizeY may be 64 samples. When partitioning schemes are used, some implementations can include one or more constraints which disallow partitioning boundaries to cut across VPDU boundaries in order to support the independent processing capabilities mentioned above. In one illustrative example where the size of the VPDUs are 64×64 samples each, the VPDUs may be implemented in hardware using pipelines that can handle 64×64 sample units. In such examples, the one or more constraints may prevent partitioning of coding units which are larger than 64×64 samples. Such a constraint can ensure that only the coding blocks which can be accommodated in a VPDU without being partitioned are allowed to be processed using the VPDUs. JVET-L1002 includes examples of these and other constraints on partitioning coding units where VPDUs are used.

With the current implementations of the ISP mode, it is possible to have coding units whose sizes exceed the 64×64 boundaries. For example, some coding units of size 64×128 and 128×64 are supported in VVC. In some cases, the ISP mode may be enabled to indicate ISP splitting for such coding units which are larger than the 64×64 boundaries. If ISP splitting is applied to such coding units of 64×128 or 128×64, for example, to result in sub-blocks which are smaller than the 64×64 boundaries, such sub-blocks can be accommodated within VPDUs for processing. The different sub-blocks of the same coding unit may not support independent processing in different VPDUs as discussed above. Therefore, processing the different sub-blocks (obtained by splitting the same coding unit) in separate VPDUs is not desirable and may violate the restrictions on coding units crossing VPDU boundaries. Since current implementations can allow coding units of sizes larger than 64×64 to be coded with ISP mode, there is a need for solutions which do not violate the VPDU size constraints when ISP mode is enabled.

Systems, methods, and computer-readable media are described herein for improving video coding. For example, the systems, methods, and computer-readable media described herein improve the design and use of the intra sub-block partitioning (ISP) mode and address the above-described needs in existing implementations. The various features described herein may be used alone, or in any suitable combination. As previously noted, the terms intra sub-block partitioning (ISP), sub-partitioning (as used with respect to the ISP mode), sub-block intra prediction (as used with respect to the ISP mode), and other similar terms may be used interchangeably herein.

In some examples of implementing an ISP mode, the semantics and/or syntax of an intra-subpartitions split flag (also referred to herein as a subpartition split flag) for a coding block can be provided in a manner which ensures the optimal value of the intra-subpartitions split flag is determined for the coding block. One illustrative example of the intra-subpartitions split flag is the intra_subpartitions_split_flag noted above. For example, in the above-described situations where one of the cbWidth or the cbHeight is larger than the MaxTbSizeY (also referred to herein as a "size threshold"), even though the intra_subpartitions_split_flag may not be present, the value of the intra_subpartition-s_split_flag is inferred to be a value which can lead to the optimal derivation of the split type variable, IntraSubPartitionsSplitType. In some examples, depending on whether the cbWidth is greater than the MaxTbSizeY or the cbHeight is greater than the MaxTbSizeY, the value of the intra_subpartitions_split_flag is inferred such that the IntraSubPartitionsSplitType derived using the inferred value of the intra_subpartitions_split_flag indicates an ISP vertical split or an ISP horizontal split, respectively. Illustrative examples showing changes to the existing syntax and/or semantics of the JVET WD4 of VVC to obtain the above-noted inference of the intra_subpartitions_split_flag are provided below.

In some examples, a partition structure for the ISP mode can be provided to ensure that dimensions of sub-blocks obtained by partitioning a coding block do not violate a size threshold such as the MaxTbSizeY. For example, an ISP mode can be provided where any dimension (width or height) of any the sub-blocks does not exceed the value of MaxTbSizeY. In one example, a recursive structure similar to a transform_tree( ) syntax structure of Table 4 (also referred to herein as a "transform tree syntax structure") can be implemented when the sub-partition split type is horizontal or vertical. In another example, when the cbWidth or cbHeight (or both the cbWidth and the cbHeight) of a coding block coded with ISP is larger than the MaxTbSizeY, the value of the variable, NumIntraSubPartitions (also referred to herein as a "subpartition number") is modified such that the width or height of the sub-blocks do not exceed the MaxTbSizeY. In another example, the semantics or syntax of intra_subpartitions_mode_flag (referred to herein as a "subpartitions mode flag") are provided to ensure that dimensions of a sub-block (width or height or both) do not exceed the MaxTbSize. In another example, when the cbWidth or the chHeight of a coding block is larger than MaxTbSizeY, the coding block is restricted to be coded with ISP coding. Illustrative examples showing changes to the existing syntax and/or semantics of the JVET WD4 of VVC to restrict the sub-block size in the above manner are further described below.

In some examples where ISP mode is enabled, one or more size constraints may be implemented for coding units which can be processed using VPDUs. In some examples, the one or more size constraints prevent ISP mode from being enabled for coding units which cross VPDU boundaries. Illustrative examples showing additional existing syntax and/or semantics for the JVET WD4 of VVC are provided below.

FIG. 4 is a block diagram illustrating an example of a coding block which can be coded with ISP using example syntax and/or semantics described herein. In some examples, various decisions pertaining to enabling the ISP mode, the type of split (horizontal or vertical) to be applied if the ISP mode is enabled, the number of ISP sub-partitions, among others may be based at least in part on one or more dimensions of the coding block. The coding block 402 is shown with the dimensions cbWidth and cbHeight corresponding to width and height of the coding block 402 respectively. The coding block 402 can include a coding block such as a CU or PU (or a CB or PB) of a picture which can be processed using the ISP mode. In some examples, the number of samples (e.g., luma samples) in the coding block 402 may be proportional to the size of the coding block 402 obtained by cbWidth×cbHeight. In some examples, an ISP mode may be used to split the coding block 402 based on a relationship of the dimensions cbWidth and cbHeight to respective size thresholds.

In some examples, the transform blocks used to split the coding block according to a transform tree structure (or other partitioning structure) may be square shaped with the maximum height and width for a transform block being the same, referred to as the maximum transform block size MaxTbSizeY. In some examples, applying the ISP mode for splitting the coding block 402 can be based on the cbWidth and cbHeight dimensions relative to the MaxTbSizeY. In some examples, the dimensions of the sub-blocks or ISP blocks obtained by splitting the coding block 402 (e.g., similar to the ISP splitting shown in FIG. 2 and FIG. 3) may also be restricted based on the MaxTbSizeY, with techniques herein described for ensuring that the sub-blocks obtained from splitting the coding block 402 also do not violate corresponding size thresholds. In some examples where the coding block 402 may be processed using VPDUs, one or more constraints on the cbWidth and cbHeight dimensions of the coding block 402 may be implemented relative to VPDU boundaries (e.g., based on a maximum width and/or height of a VPDU). These and other examples will be discussed in further detail below.

As previously mentioned, there may be situations in which the intra_subpartitions_split_flag may not be signaled for coding blocks which are specified for coding using the ISP mode. In some examples, if the intra-subpartitions split flag (e.g., intra_subpartitions_split_flag) for the coding block 402 is not present, then the value of the intra-subpartitions split flag (e.g., intra_subpartitions_split_flag) for the coding block 402 may be inferred to be a first value or a second value based on the cbWidth and/or the cbHeight relative to a size threshold such as the maximum transform block size, MaxTbSizeY. In some examples, the split type (vertical or horizontal) to be applied to the coding block 402 can be based on the first value or the second value.

In some examples, the ISP mode flag for the coding block 402 (e.g., intra_subpartitions_mode_flag) may be signaled when the cbWidth or the cbHeight is less than or equal to MaxTbSizeY or if both the cbWidth and the cbHeight are less than or equal to MaxTbSizeY. Accordingly, in examples where one of the cbWidth or the cbHeight is larger than MaxTbSizeY and the other is smaller, the intra_subpartitions_mode_flag is signaled with a value (e.g., a value of 1 indicating that the ISP mode is enabled for the coding block or a value of 0 indicating that the ISP mode is not performed for the coding block). In such implementations, since one of the cbWidth or the cbHeight is greater than MaxTbSizeY, the intra-subpartitions split flag, intra_subpartitions_split_flag, may not be present or may not be signaled.

In some examples, when the ISP mode for the coding block 402 is enabled (e.g., when the intra_subpartitions_mode_flag is signaled) and the intra-subpartitions split flag (e.g., intra_subpartitions_split_flag) is not present, then if cbWidth is greater than MaxTbSizeY, then the intra-subpartitions split flag (e.g., intra_subpartitions_split_flag) may be inferred to be equal to a first value (e.g., a value of 1) for the coding block 402. In some examples, applying the formula for the split type obtained by IntraSubPartitionsSplitType being equal to 1+intra_subpartitions_split_flag (i.e., IntraSubPartitionsSplitType is equal to 2) can indicate that the value of intra_subpartitions_split_flag being inferred to be equal to 1 can result in a vertical split (e.g., as seen in the name association in Table 3 for the IntraSubPartitionsSplitType value 2 corresponding to the ISP vertical split ISP_VER_SPLIT).

On the other hand, when the ISP mode for the coding block 402 is enabled (e.g., when the intra_subpartitions_mode_flag is signaled) and the intra-subpartitions split flag (e.g., intra_subpartitions_split_flag) is not present, then if cbHeight is greater than MaxTbSizeY, then the intra-subpartitions split flag (e.g., intra_subpartitions_split_flag) may be inferred to be equal to a second value (e.g., a value of 0)

for the coding block 402. In some examples, applying the formula for the split type obtained by IntraSubPartitionsSplitType being equal to 1+intra_subpartitions_split_flag (i.e., IntraSubPartitionsSplitType is equal to 1) can indicate that the value of intra_subpartitions_split_flag being inferred to be equal to 0 in this case can result in a horizontal split (e.g., as seen in the name association in Table 3 for the IntraSubPartitionsSplitType value 1 corresponding to the ISP horizontal split ISP_HOR_SPLIT).

In some cases, when the ISP mode for the coding block 402 is enabled (e.g., when the intra_subpartitions_mode_flag is signaled with a true value, such as 1) and if neither cbHeight nor cbWidth is greater than MaxTbSizeY, then the intra-subpartitions split flag is signaled and the value of the intra_subpartitions_split_flag indicates whether the split type is vertical or horizontal as mentioned above.

Examples are now described showing changes to the existing syntax and/or semantics of JVET WD4 of VVC with respect to the intra_subpartitions_split_flag. The additions to the Specification are shown in italicized text, with strikethrough text showing removal of text from the Specification. The following syntax is used to describe the above implementation for the coding block 402 being present at coordinates [x0][y0], where the changes to existing implementations are highlighted in italicized text, with strikethrough highlighting removal from the Specification.

intra_subpartitions_split_flag[x0][y0] specifies whether the intra subpartitions split type is horizontal or vertical. When intra_subpartitions_split_flag[x0][y0] is not present, it is inferred as follows:

If cbWidth>MaxTbSizeY, intra_subpartitions_split_flag[x0][y0] is inferred to be equal to 1.

Else, if cbHeight>MaxTbSizeY, intra_subpartitions_split_flag[x0][y0] is inferred to be equal to 0.

IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

As previously described, the variable NumIntraSubPartitions can be used to specify the number of sub-blocks that the coding block 402 is divided into based on the minimum sample requirement for the sub-blocks, the intra_subpartitions_split_flag, and the intra_subpartitions_mode_flag. For example, referring to Table 3, if the variable IntraSubPartitionsSplitType has a value equal to 0, indicating ISP_NO_SPLIT, then the value of the variable NumIntraSubPartitions is set equal to 1 (which is a default value indicating that there is no ISP applied to the coding block 402). Otherwise, if the variable IntraSubPartitionsSplitType has a value equal to 1 (horizontal split ISP_HOR_SPLIT) or 2 (vertical split ISP_VER_SPLIT), the value of the variable NumIntraSubPartitions is set equal to 2 or 4 based on the dimensions of the coding unit or current block as explained with reference to FIG. 2 and FIG. 3. For example, if the coding block 402 is a 4×8 block (cbWidth is equal to 4 and cbHeight is equal to 8) or an 8×4 block (cbWidth is equal to 8 and cbHeight is equal to 4), then the NumIntraSubPartitions is set to 2, to implement splitting the coding block 402 into two ISP blocks which have the minimum number of 16 samples each, based on a horizontal or a vertical split which can be indicated by the variable IntraSubPartitionsSplitType. On the other hand, if the dimensions cbWidth and cbHeight of the coding block 402 correspond to other than (greater than) the 8×4, 4×8, and 4×4 block sizes, then the NumIntraSubPartitions is set equal to 4.

In another example, when the ISP mode for the coding block 402 is enabled (e.g., when the intra_subpartitions_mode_flag is signaled) and the intra-subpartitions split flag, intra_subpartitions_split_flag is not present, then if cbWidth is greater than MaxTbSizeY and cbHeight is less than or equal to MaxTbSizeY, then intra_subpartitions_split_flag may be inferred to be equal to the first value (e.g., a value of 1) for the coding block 402. In some examples, applying the formula for the split type obtained by IntraSubPartitionsSplitType being equal to 1+intra_subpartitions_split_flag (i.e., IntraSubPartitionsSplitType is equal to 2) can indicate that the value of intra_subpartitions_split_flag being inferred to be equal to 1 in this case can result in a vertical split (e.g., as seen in the name association in Table 3 for the IntraSubPartitionsSplitType value 2 corresponding to the ISP vertical split ISP_VER_SPLIT).

On the other hand, when the ISP mode for the coding block 402 is enabled (e.g., when the intra_subpartitions_mode_flag is signaled) and the intra-subpartitions split flag, intra_subpartitions_split_flag is not present, then if cbHeight is greater than MaxTbSizeY and cbWidth is less than or equal to MaxTbSizeY, then intra_subpartitions_split_flag may be inferred to be equal to the second value (e.g., a value of 0) for the coding block 402. In some examples, applying the formula for the split type obtained by IntraSubPartitionsSplitType being equal to 1+intra_subpartitions_split_flag (i.e., IntraSubPartitionsSplitType is equal to 1) can indicate that the value of intra_subpartitions_split_flag being inferred to be equal to 1 in this case can result in a horizontal split (e.g., as seen in the name association in Table 3 for the IntraSubPartitionsSplitType value 1 corresponding to the ISP horizontal split ISP_HOR_SPLIT).

The following syntax is used to describe the above implementation for the coding block 402 being present at coordinates [x0][y0], where the changes to existing implementations are highlighted in italicized text, with strikethrough highlighting removal from the Specification.

intra_subpartitions_split_flag[x0][y0] specifies whether the intra subpartitions split type is horizontal or vertical. When intra_subpartitions_split_flag[x0][y0] is not present, it is inferred as follows:

If cbWidth>MaxTbSizeY and cbHeight<=MaxTbSizeY, intra_subpartitions_split_flag[x0][y0] is inferred to be equal to 1.

Otherwise, if cbHeight>MaxTbSizeY and cbWidth<=MaxTbSizeY, intra_subpartitions_split_flag[x0][y0] is inferred to be equal to 0.

Otherwise, intra_subpartitions_split_flag[x0][y0] to be equal to 0.

Examples are now described showing changes to the existing syntax and/or semantics of JVET WD4 of VVC with respect to defining a partition structure for ISP where dimensions of sub-blocks obtained from partitioning a coding block do not exceed the size threshold of MaxTbSizeY. The additions to the Tables 2 and 4 are shown in italicized text, with strikethrough text showing removal of text from the corresponding Specification.

In a first example of defining a partition structure for the coding block 402 for which ISP mode is enabled, two or more sub-blocks may be obtained based on applying a horizontal or vertical split as appropriate based on the above discussion of the intra_subpartitions_mode_flag and intra_subpartitions_split_flag. For example, sub-blocks or ISP blocks may be obtained as explained with reference to FIG. 2 and FIG. 3. The dimensions of these sub-blocks may be tested for compliance with the requirement of being less than MaxTbSizeY. If any dimension (width or height) of the individual sub-blocks obtained from splitting the coding block 402 (for which ISP mode is enabled) exceed MaxTb-SizeY, then they are recursively partitioned until sub-blocks are obtained whose widths and heights do not exceed the value of MaxTbSizeY.

In one example, when the widths or heights of the sub-blocks exceed MaxTbSizeY, the sub-blocks can be further split using the transform_tree( ) structure of Table 4 when the split type is NO_ISP_SPLIT. On the other hand, when the split type is horizontal for a coding block whose cbHeight exceeds MaxTbSizeY, for example, then the coding block may first be split into the default number of four sub-blocks (assuming minimum sample requirements for the four sub-blocks can be met, as discussed with reference to FIG. 3). If the resultant four sub-blocks have a width which exceeds MaxTbSizeY, then the four sub-blocks would be split using a vertical split type to result in two or four further sub-blocks each (depending on the width and minimum sample requirements for each sub-block) and the dimensions of these further sub-blocks may be tested for compliance with the MaxTbSizeY size threshold. The above process of splitting the sub-blocks may proceed recursively until the final sub-blocks satisfy the MaxTbSizeY size threshold.

In an illustrative example where the MaxTbSizeY=32, and the coding block 402 has a cbWidth 64 and cbHeight 128 (i.e., the coding block 402 is a 64×128 block), a horizontal ISP split would result in sub-blocks of size 64×32, where the width of the sub-blocks would exceed MaxTb-SizeY. In this case, the transform_tree( ) syntax structure of Table 4 would be applied with NO_ISP_SPLIT mode (this is only for the split and the internal prediction would follow ISP processing) and each 64×32 sub-block would be split into two 32×32 blocks.

For the case of the split type being vertical (ISP_VER_SPLIT) or horizontal (ISP_HOR_SPLIT) (i.e., when the split type is set to be a value which is not equal to ISP_NO_SPLIT) and one of the width or height of a coding block or sub-block exceeds MaxTbSizeY, the transform_tree( ) structure of Table 4 can be modified. For example, the syntax table of coding_unit( ) and transform_tree( ) may be modified from the Tables 2 and 4, respectively, for horizontal and vertical split types, where the modifications are identified in the italicized text below in Table 2' and Table 4' respectively.

TABLE 2'

| Syntax table of modified coding unit | |
| --- | --- |
| | Descriptor |
| coding_unit( x0, y0, cbWidth, cbHeight, treeType ) { | |
| if( tile_group_type != I ) { | |
| ... | |
| cu_cbf | ae(v) |
| if( cu_cbf ) | |
| transform_tree( x0, y0, cbWidth, cbHeight, treeType , | |
| *IntraSubPartSplitType , idx* ) | |
| } | |
| } | |

TABLE 4'

| Syntax table of modified transform tree | |
| --- | --- |
| | Descriptor |
| transform_tree( x0, y0, tbWidth, tbHeight, treeType, | |
| *splitType, idx* ) { | |
| InferTuCbfLuma = 1 | |

TABLE 4'-continued

| Syntax table of modified transform tree | |
| --- | --- |
| | Descriptor |
| if( ~~IntraSubPartSplitType~~ *splitType* = = NO_ISP_SPLIT ) { | |
| if( tbWidth > MaxTbSizeY \| \| tbHeight > | |
| MaxTbSizeY ) { | |
| trafoWidth = ( tbWidth > MaxTbSizeY ) ? | |
| (tbWidth / 2) : tbWidth | |
| trafoHeight = ( tbHeight > MaxTbSizeY ) ? | |
| (tbHeight / 2) : tbHeight | |
| transform_tree( x0, y0, trafoWidth, trafoHeight ) | |
| if( tbWidth > MaxTbSizeY ) | |
| transform_tree( x0 + trafoWidth, y0, trafoWidth, | |
| trafoHeight, treeType ) | |
| if( tbHeight > MaxTbSizeY ) | |
| transform_tree( x0, y0 + trafoHeight, trafoWidth, | |
| trafoHeight, treeType ) | |
| if( tbWidth > MaxTbSizeY && tbHeight > | |
| MaxTbSizeY ) | |
| transform_tree( x0 + trafoWidth, y0 + trafoHeight, | |
| trafoWidth, trafoHeight, treeType ) | |
| } else { | |
| transform_unit( x0, y0, tbWidth, tbHeight, | |
| treeType,θ *idx* ) | |
| } | |
| } else if( ~~IntraSubPartSplitType~~ *splitType* = = ISP_HOR_SPLIT ) { | |
| trafoHeight = tbHeight / NumIntraSubPartitions | |
| for( partIdx = 0; partIdx < NumIntraSubPartitions; | |
| partIdx++ ) | |
| *if( tbWidth > MaxTbSizeY )* | |
| *transform_tree( x0, y0 + trafoHeight * partIdx, tbWidth,* | |
| *trafoHeight, treeType, ISP_NO_SPLIT , partIdx )* | |
| *else* | |
| transform_unit( x0, y0 + trafoHeight * partIdx, tbWidth, | |
| trafoHeight, treeType, partIdx ) | |
| } else if( ~~IntraSubPartSplitType~~ *splitType* = = ISP_VER_SPLIT ) { | |
| trafoWidth = tbWidth / NumIntraSubPartitions | |
| for( partIdx = 0; partIdx < NumIntraSubPartitions; | |
| partIdx++ ) | |
| *if( tbHeight > MaxTbSizeY )* | |
| *transform_tree( x0 + trafoWidth * partIdx, y0, trafoWidth,* | |
| *tbHeight, treeType, ISP_NO_SPLIT, partIdx )* | |
| *else* | |
| transform_unit( x0 + trafoWidth * partIdx, y0, trafoWidth, | |
| tbHeight, treeType, partIdx ) | |
| } | |
| } | |

In an alternative implementation, the split type utilized by the transform_tree( ) for a sub-block can be set to a value where the split type may lead to a reduction in either the width or the height dimension that exceeds MaxTbSizeY. In such examples, the number of subpartitions at each stage of the transform tree reduction may be the same or derived separately. Considering the same example as above, where the MaxTbSizeY=32, and a cbWidth 64 and cbHeight of 128 (i.e., a 64×128 coding block), a horizontal ISP split would result in sub-blocks of size 64×32, where the width would exceed MaxTbSizeY. In this case, the transform_tree( ) syntax structure of Table 4' can be utilized when the split type is NO_ISP_SPLIT and each 64×32 sub-block would be split into two 32×32 blocks. For the cases where the split type is horizontal or vertical, the syntax structure of the transform_tree( ) shown in Table 4" below can be utilized in some alternatives. Table 4" below includes modifications to Table 4 as highlighted in italicized text, where Table 4" can be utilized for implementations where the split type is set to horizontal or vertical based on whether a horizontal or a vertical split, respectively, would lead to a reduction in the dimension (height or width) that exceeds MaxTbSizeY:

TABLE 4"

Syntax table of modified transform tree

|  | Descriptor |
|---|---|
| transform_tree( x0, y0, tbWidth, tbHeight, treeType, *splitType, idx* ) { | |
|   InferTuCbfLuma = 1 | |
|   if( ~~IntraSubPartSplitType~~ *splitType* = = NO_ISP_SPLIT ) { | |
|     if( tbWidth > MaxTbSizeY \| \| tbHeight > | |
|     MaxTbSizeY ) { | |
|       trafoWidth = ( tbWidth > MaxTbSizeY ) ? | |
|     (tbWidth / 2) : tbWidth | |
|       trafoHeight = ( tbHeight > MaxTbSizeY ) ? | |
|     (tbHeight / 2) : tbHeight | |
|       transform_tree( x0, y0, trafoWidth, trafoHeight ) | |
|       if( tbWidth > MaxTbSizeY ) | |
|         transform_tree( x0 + trafoWidth, y0, trafoWidth, | |
|         trafoHeight, treeType ) | |
|       if( tbHeight > MaxTbSizeY ) | |
|         transform_tree( x0, y0 + trafoHeight, trafoWidth, | |
|         trafoHeight, treeType ) | |
|       if( tbWidth > MaxTbSizeY && tbHeight > | |
|       MaxTbSizeY ) | |
|    transform_tree( x0 + trafoWidth, y0 + trafoHeight, | |
|   trafoWidth, trafoHeight, treeType ) | |
|     } else { | |
|       transform_unit( x0, y0, tbWidth, tbHeight, | |
|       treeType, ~~0~~ *idx* ) | |
|     } | |
|   } else if( ~~IntraSubPartSplitType~~ *splitType* = = ISP_HOR_SPLIT ) { | |
|     trafoHeight = tbHeight / NumIntraSubPartitions | |
|     for( partIdx = 0; partIdx < NumIntraSubPartitions; | |
|     partIdx++ ) | |
|       *if( tbWidth > MaxTbSizeY )* | |
|     *transform_tree( x0, y0 + trafoHeight * partIdx, tbWidth,* | |
|   *trafoHeight, treeType, ISP_VER_SPLIT , partIdx )* | |
|       *else* | |
|     transform_unit( x0, y0 + trafoHeight * partIdx, tbWidth, | |
|   trafoHeight, treeType, partIdx ) | |
|   } else if(( ~~IntraSubPartSplitType~~ *splitType* = = ISP_VER_SPLIT ) { | |
|     trafoWidth = tbWidth / NumIntraSubPartitions | |
|     for( partIdx = 0; partIdx < NumIntraSubPartitions; | |
|     partIdx++ ) | |
|       *if( tbHeight > MaxTbSizeY )* | |
|     *transform_tree( x0 + trafoWidth * partIdx, y0, trafoWidth,* | |
|   *tbHeight, treeType, ISP_HOR_SPLIT , partIdx )* | |
|       *else* | |
|     transform_unit( x0 + trafoWidth * partIdx, y0, trafoWidth, | |
|   tbHeight, treeType, partIdx) | |
|   } | |
| } | |

In other examples where ISP mode is enabled, for each sub-block obtained from splitting a block using ISP mode, both of the transform_tree( ) structures of Table 4' and Table 4" may be utilized for either of the two split types, horizontal or vertical split types. A selection between Table 4' and Table 4" for the modified transform tree( ) can be based on a relationship between the width and height of the blocks and the MaxTbSizeY.

In the above examples of splitting a coding block into sub-blocks using the ISP mode, in cases where one or more resulting sub-blocks are further partitioned, the value of the partition index (partIdx) for sub-blocks may be assigned based on the processing order for the sub-blocks. In one example, the partIdx may be assigned to the sub-blocks such that only the first subpartition (in either the normal or reverse order as previously described) is assigned a partIdx value of 0 and the remaining subpartitions are assigned values according to the decoding order of the subpartitions. In other examples, one or more sub-blocks may be assigned a partIdx value of 0, indicating that the same processing is applied for all subpartitions currently assigned the partIdx value of 0.

In another example of splitting a coding block using ISP when the ISP mode is enabled, the number of subpartitions that the coding block is split into is assigned such that neither the width nor the height of any resulting sub-block exceeds the value of MaxTbSizeY. The following semantics identify splitting the coding block into the number of subpartitions which ensures that the resulting sub-blocks are compliant with the MaxTbSizeY size threshold. The italicized text identifies modifications from existing implementations of ISP splitting.

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:
cbWidth is equal to 4 and cbHeight is equal to 8,
cbWidth is equal to 8 and cbHeight is equal to 4.

Otherwise, if cbWidth<=MaxTbSizeY, cbHeight>MaxTbSizeY and IntraSubPartitionsSplitType is equal to ISP_HOR_SPLIT, NumIntraSubPartitions is set equal to Max(4,cbHeight/MaxTbSizeY).

Otherwise, if cbWidth>MaxTbSizeY, cbHeight<=MaxTbSizeY and IntraSubPartitionsSplitType is equal to ISP_HOR_SPLIT, NumIntraSubPartitions is set equal to Max(4,cbWidth/MaxTbSizeY).

Otherwise, NumIntraSubPartitions is set equal to 4.

In some implementations, in addition to the changes above, the following constraints are added such the values of intra_subpartitions_mode_flag and the intra_subpartitions_split_flag are constrained such that both the width and height of subpartitions resulting from splitting a coding block are less than or equal to MaxTbSizeY.

In some implementations of a coding block having the ISP mode enabled, when the width of the coding block, cbWidth is greater than the MaxTbSizeY or the height of the coding block, cbHeight is greater than MaxTbSizeY (or both the cbWidth and cbHeight are greater than the MaxTbSizeY), the coding block may be split both horizontally and vertically. The number of subpartitions, NumIntraSubPartitions for such cases can be assigned to be equal to 4. In some implementations, NumIntraSubPartitions may be derived to be equal to the maximum value of 4, and cbWidth*cbHeight/MaxTbSizeY/MaxTbSizeY, represented by the expression, Max(4, cbWidth*cbHeight/MaxTbSizeY/MaxTbSizeY). In such implementations, the order of decoding the subpartitions may be defined to be similar to the order of decoding the coding units, or another scan order which can be specified for the ISP mode.

In another example of partitioning a coding block when ISP mode is enabled, a constraint can be added such that the value of intra_subpartitions_mode_flag is disallowed to be 1 when the width or height any of the sub-blocks resulting from splitting the coding block are larger than MaxTbSizeY. The following semantics illustrate such implementations, with the italicized text highlighting modifications from existing implementations:

It is a requirement of bitstream conformance that when intra_sub_partitions_mode_flag[x0][y0] is equal to 1 for a coding block with width cbWidth and height cbHeight, the value of sbWidth and sbHeight shall be both less than or equal to MaxTbSizeY, where sbWidth and sbHeight are derived as follows:

When IntraSubPartitionsSplitType is equal to ISP_HOR_SPLIT, sbWidth is set equal to width of cbWidth and sbHeight is set equal to cbHeight/NumIntraSubPartitions.

When IntraSubPartitionsSplitType is equal to ISP_VER_SPLIT, sbWidth is set equal to width of cbWidth/NumIntraSubPartitions and sbHeight is set equal to cbHeight.

In another example, the signaling of the syntax element intra_subpartitions_mode_flag is constrained such that the value of intra_subpartitions_mode_flag is not signaled and inferred to be equal to 0 when a sub-block resulting from splitting a coding block would have a width or height (or both width and height) greater than MaxTbSizeY. For example, if any of the sub-blocks obtained from splitting a coding block may have one or more of the width and height be greater than MaxTbSizeY, then ISP mode for the coding block can be disabled.

Examples are now described showing changes to the existing syntax and/or semantics of JVET WD4 of VVC with respect to VPDU boundaries. The additions to existing implementations of the Specification are shown in italicized text, with strikethrough text showing removal of text from the Specification. In such examples, a constraint can be added to ensure that a coding block coded with the ISP mode enabled does not cross the VPDU boundaries. Semantics can be added to the Specification as follows:

It is a requirement of bitstream conformance that when cbWidth or cbHeight is greater than SizeV, the value of intra_subpartitions_mode_flag shall be equal to 0.

In some cases, the width and height constraints of a VPDU may not be equal, in which the case the bitstream constraint is applied to the width and height separately for the CU.

In some cases, the constraint may be imposed in the syntax as follows: when cbWidth or cbHeight is greater than SizeV, the syntax element intra_subpartitions_mode_flag is not signaled and the value of intra_subpartitions_mode_flag is inferred to be equal to 0.

As previously mentioned, virtual pipeline data unit (VP-DUs) are non-overlapping cells in a picture or video frame which can be used for parallel processing. In some examples, the VPDU construct can include virtual blocks that are used for memory access (e.g., to determine which area of memory is used for processing a particular block or blocks of data), defining the size of the memory allocated to implement the Standard-based coding process (e.g., HEVC, VVC, or other coding process). Although the VPDU construct may not correspond to block partitioning mechanisms for coding purposes, the VPDUs may be used in video processing pipelines. For example, in the hardware decoding process, consecutive VPDUs can be processed in parallel by multiple processing/decoding pipeline stages (e.g., different decoding pipeline stages process different VPDUs simultaneously). In some cases, a VPDU size can be roughly proportional to the buffer size in some pipelines. For instance, a VPDU size can be set to the size of a transform block (TB) size. In one illustrative example, the size of a VPDU can be 64×64 samples (e.g., luma samples). In HEVC, the VPDU size is set to maximum transform block size which is 32×32-L (Luma samples) and 16×16-C (Chroma samples). In VVC, the VPDU size is set to 64×64-L (Luma samples) and 32×32-C(Chroma samples), which results in the request of larger VPDU sizes.

In some examples, a VPDU can contain one or more multiple blocks (e.g., a CU, PU, TU, or other block). For example, in some cases, a single CU can be included in one VPDU (e.g., the size of the CU and the VPDU size are the same). Referring to FIG. 4, if the size of the coding block 402 corresponds to a VPDU size, then the coding block 402 can be contained within a single VPDU. In an illustrative example where the coding block 402 and the VPDU are square blocks with each side of the VPDU being of a size, SizeV, the width cbWidth and the height cbHeight of the coding block 402 would each be equal to SizeV. In such examples where a VPDU may entirely contain a coding block, the coding block would not cross the VPDU boundaries. Thus, if the coding block 402 is coded with ISP mode, the coding block 402 would not violate the VPDU constraint by crossing the VPDU boundaries. Accordingly, in such examples, when cbWidth and the cbHeight are less than or equal to the size threshold of the VPDU, SizeV, the syntax element intra_subpartitions_mode_flag can be signaled with a value of 1 indicating that ISP mode is enabled for the coding block 402.

Figure 5:
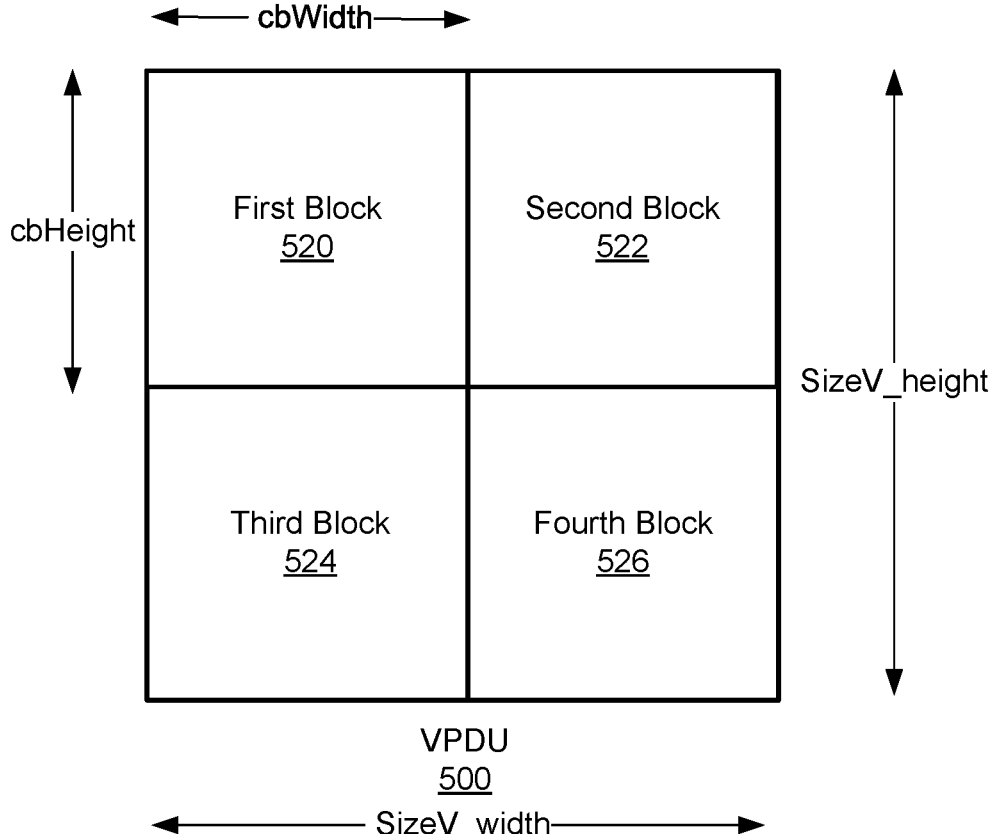
FIG. 5 is a conceptual diagram illustrating an example of a VPDU containing four blocks, in accordance with some examples.

FIG. 5 is a diagram illustrating an example of a VPDU 500 multiple coding units. In one such example, each of the multiple CUs contained within the VPDU 500 can have sizes that are smaller than the VPDU size. As shown, four blocks or coding units are identified within the VPDU 500, including a first block 520, a second block 522, a third block 524, and a fourth block 526. Each of the first block 520, the second block 522, the third block 524, and/or the fourth block 526 can be a CU, a PU, a TU, or other block of a picture. The dimensions, width cbWidth and height cbHeight have been identified for the first block 520 to illustrate the relationship of these dimensions to the size of the VPDU 500. Correspondingly, a height SizeV_height and width SizeV_width have also been identified for the VPDU 500, where in some examples, the SizeV_height and the SizeV_width may be equal to the same value, SizeV.

In the above example, the width cbWidth of the first block 520 would be less than the width SizeV_width of the VPDU 500, and the height cbHeight of the first block 520 would be less than the height SizeV_height of the VPDU 500. Therefore, if the first block 520 is coded with ISP mode, the first block 520 would not violate the VPDU constraint by crossing the VPDU boundaries. Accordingly, in such examples, when cbWidth and the cbHeight are less than or equal to the size thresholds corresponding to the VPDU boundaries, the ISP mode can be allowable for the first block 520 and the syntax element intra_subpartitions_mode_flag can be signaled with a value of 1 indicating that ISP mode is used for the first block 520. Although not explicitly shown, the dimensions of the second block 522, the third block 524, and the fourth block 526 may be the same as those discussed above with reference to the first block 520. Accordingly in such examples, the second block 522, the third block 524, and the fourth block 526 may also be coded with ISP mode enabled. In some examples, whether the ISP mode can be enabled or used when the ISP mode is allowable based on the VPDU constraint may be based on further comparisons of the cbWidth and the cbHeight with the maximum transform block size threshold MaxTbSizeY as previously explained, and further described below.

In some examples, the size of a coding block (e.g., a CU, PU, or other block can span multiple VPDUs. For example, a coding block may be processed using multiple VPDUs. For example, a coding block having a size of 128×64 (128 samples wide×64 samples high) or a coding block having a size of 64×128 (64 samples wide×128 samples high) can span two VPDUs that each have a size of 64×64. In another example, a coding block having a size of 128×128 (128 samples wide×128 samples high) can span four VPDUs that each have a size of 64×64. The coding block can be split into a certain number of sub-blocks for performing inter-prediction by each of the VPDU pipeline stages. For example, a 128×128 coding block can be split into for 64×64 sub-blocks for processing by four different VPDU pipeline stages. The coding block can be split for inter-prediction because there is no dependency on neighboring blocks for performing inter-prediction. However, such coding blocks which span multiple VPDUs also cross VPDU boundaries, which may violate the VPDU constraint on allowing the intra-subpartition mode to be used for splitting the coding blocks.

Figure 6:
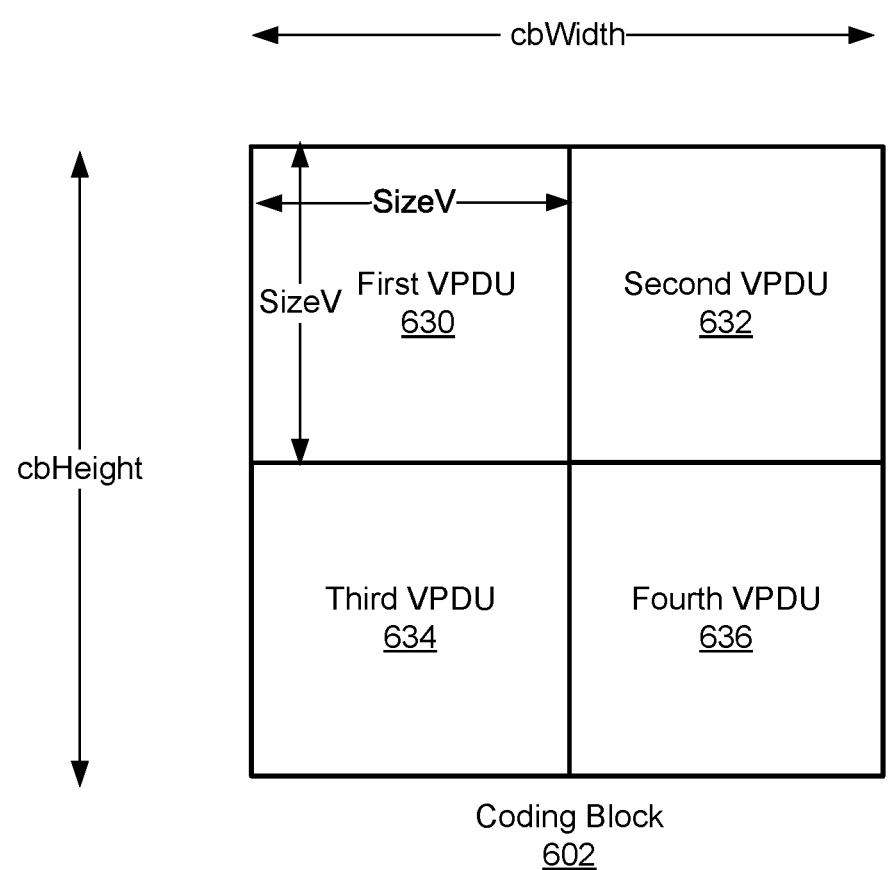
FIG. 6 is a conceptual diagram illustrating an example of current block spanning multiple VPDUs, in accordance with some examples.

FIG. 6 is a diagram illustrating an example of a coding block 602 spanning multiple VPDUs. For example, the coding block 602 contains the samples associated with four VPDUs, including a first VPDU 630, a second VPDU 632, a third VPDU 634, and a fourth VPDU 636. The coding block 602 can have dimensions including a width cbWidth and a height cbHeight. Each of the four VPDUs may have dimensions including width and height of SizeV (as representatively illustrated for the first VPDU 630). In one illustrative example, the current block 602 has a size of 128×128, and each of the VPDUs 630-634 have a size of 64×64. The coding block 602 can be a CU, a PU, a TU, or other block of a picture.

In the example of FIG. 6, both the cbWidth and the cbHeight of the coding block 602 are greater than the SizeV of each of the four VPDUs 630-634. Thus, the dimensions of the coding block 602 would violate the requirements for the coding block 602 to be coded with ISP mode. As previously noted, in example implementations, bitstream conformance can include a requirement that when cbWidth or cbHeight a coding block is greater than SizeV, the value of intra_subpartitions_mode_flag shall be equal to 0. In examples where the width and height of a VPDU may not be equal (e.g., as discussed with reference to FIG. 6), the bitstream conformance can include a requirement that when cbWidth is greater than SizeV_width or cbHeight is greater than SizeV_height, the value of intra_subpartitions_mode_flag shall be equal to 0, to indicate that the ISP mode is not enabled for the coding block 602. In some examples, the intra_subpartitions_mode_flag for the coding block 602 can be set to 0 based on cbWidth and cbHeight of the coding block 602 being greater than the SizeV of the first VPDU 630 (and similarly, greater than the SizeV of the remaining VPDUs 632, 634, and 636).

In another alternative as previously noted, a constraint may be imposed in the syntax for the ISP mode that when cbWidth or cbHeight is greater than SizeV, the syntax element intra_subpartitions_mode_flag is not signaled and the value of intra_subpartitions_mode_flag is inferred to be equal to 0. Thus, in the case of the coding block 602, because cbWidth and cbHeight are greater than SizeV for one or more VPDUs, including the four VPDUs 630-636, the intra_subpartitions_mode_flag is not signaled, e.g., by an encoding device, for the coding block 602. In such cases where the intra_subpartitions_mode_flag is not signaled or included in an encoded bitstream containing the coding block 602, the value of intra_subpartitions_mode_flag can be inferred to be equal to 0, e.g., by a decoding device which receives the encoded bitstream.

In some examples, determining whether the ISP mode is allowable based on the above comparison of the dimensions of the coding block with VPDU boundaries can be combined with other considerations for enabling the ISP mode when the ISP mode is allowable. For example, when the one or more VPDU constraints are satisfied, the intra_subpartitions_mode_flag may be signaled to indicate that the ISP mode is enabled for a block. For example, as previously discussed with reference to existing implementations, the intra_subpartitions_mode_flag may be signaled (e.g., to indicate ISP is enabled) for a coding block when one of the cbWidth or cbHeight is larger than MaxTbSizeY and the other one of the cbWidth or cbHeight is smaller than MaxTbSizeY, or if both cbWidth and cbHeight are smaller than MaxTbSizeY.

Thus, in examples where the maximum transform block size MaxTbSizeY is the same as the VPDU, then if either the cbWidth or the cbHeight of a coding block is larger than SizeV (where SizeV is equal to MaxTbSizeY), then ISP mode is not allowable and therefore the intra_subpartitions_mode_flag is not signaled for the coding block, as the coding block's dimensions would violate the one or more VPDU constraints by crossing the VPDU boundary. For example, if in an illustrative example, SizeV and MaxTbSizeY are both equal to 64, then for either cbWidth or the cbHeight being greater than 64, the VPDU constraint would prevent the ISP mode from being allowable and the intra_subpartitions_mode_flag is not signaled (i.e., the ISP mode is not enabled) for the coding block.

However, if in another illustrative example, MaxTbSizeY is 32 and SizeV is 64, then it is possible for intra_subpartitions_mode_flag to be allowable and enabled in some situations. For example, if cbWidth is equal to 64 and cbHeight is equal to 32 for a coding block, then cbWidth and cbHeight would be less than SizeV in this example, thus leading to a determination that the ISP mode is allowed based on the VPDU constraint being met. Further, since cbWidth being equal to 64 would make cbWidth greater than MaxTbSizeY of size 32 and cbHeight being equal to 32 would make cbHeight less than or equal to the MaxTbSizeY of size 32, the ISP mode for the coding block can be enabled and intra_subpartitions_mode_flag can be signaled in a bit stream, e.g., by an encoding device. However, the intra_subpartitions_split_flag would not be signaled because cbWidth is greater than the MaxTbSizeY of 32. In such an example, existing implementations of a decoding device receiving the bit stream may infer the value of the intra_subpartitions_split_flag to be 0 (corresponding to the horizontal split ISP_HOR_SPLIT) as explained with reference to Table 2, leading to an undesirable outcome. However, by implementing the modifications for inferring the value of intra_subpartitions_split_flag to be the vertical split ISP_VER_SPLIT as discussed with reference to FIG. 7, the desirable split for the coding block of cbWidth equal to 64 and cbHeight equal to 32 would result in two sub-blocks of width 32 and height 32 each, where these resulting sub-blocks would be confined within the MaxTbSizeY of size 32.

In another example, signaling of the intra_subpartitions_mode_flag can also be modified from the existing implementation to disable the ISP mode (or not signal the intra_subpartitions_mode_flag) when either the cbWidth or the cbHeight of the coding block is greater than MaxTbSizeY. As previously noted, when the width or the height of a luma coding block is larger than the maximum transform size MaxTbSizeY, the coding block is split into two or more transform units as specified in the transform_tree( ) syntax structure of Table 2. The above-noted problem of the intra_subpartitions_split_flag being inferred to be 0 (corresponding to the horizontal split ISP_HOR_SPLIT) regardless of whether the vertical or the horizontal split would be the optimal choice arises due to the syntax of the intra_subpartitions_mode_flag in existing implementations which allows the intra_subpartitions_mode_flag to be signaled when one of the cbWidth and the cbHeight of the coding block is greater than MaxTbSizeY and the other one of the cbWidth and the cbHeight is less than or equal to the MaxTbSizeY. However, if intra_subpartitions_mode_flag is only signaled when both the cbWidth and the cbHeight are less than or equal to the MaxTbSizeY, then the syntax for both the intra_subpartitions_mode_flag and the intra_subpartitions_split_flag would become consistent with one another. For example, Table 2″ shown below illustrates in italicized text a modification to the signaling of the intra_subpartitions_mode_flag when cbWidth<=MaxTbSizeY && cbHeight<=MaxTbSizeY (where in the existing implementation of Table 2, intra_subpartitions_mode_flag was signaled when (cbWidth<=MaxTbSizeY||cbHeight<=MaxTbSizeY).

TABLE 2″

Syntax table of modified transform tree

```
if (intra_luma_ref_idx[ x0 ][ y0 ] = = 0 &&
   ( cbWidth <= MaxTbSizeY && cbHeight <= MaxTbSizeY ) &&
   ( cbWidth * cbHeight > MinTbSizeY * MinTbSizeY ))
   intra_subpartitions_mode_flag[ x0 ][ y0 ]
if( intra_subpartitions_mode_flag[ x0 ][ y0 ] = = 1 &&
   cbWidth <= MaxTbSizeY && cbHeight <= MaxTbSizeY )
   intra_subpartitions_split_flag[ x0 ][ y0 ]
```

In implementations where intra_subpartitions_mode_flag is signaled for a coding block when cbWidth less than or equal to the size threshold MaxTbSizeY and cbHeight is less than or equal to the size threshold MaxTbSizeY, it can be appreciated that the signaling of the intra_subpartitions_mode_flag based on a relationship between the dimensions of the coding block and the size threshold is the same for when the size threshold is based on the VPDU size (SizeV) or the maximum transform block size (MaxTbSizeY). Thus, intra_subpartitions_mode_flag is signaled to enable ISP mode for a coding block for which ISP mode is allowed when cbWidth and cbHeight are both less than the size threshold, where the size threshold is SizeV equal to MaxTbSizeY. If either one of the cbWidth or the cbHeight violates the size threshold then intra_subpartitions_mode_flag is not signaled and ISP mode may be disallowed or disabled for the coding block.

FIG. 7 is a flowchart illustrating an example of a process 700 of decoding video data by determining a type of sub-partition to be applied for a coding block for which intra_subpartition (ISP) mode is enabled. At 702, the process 700 includes obtaining an encoded video bitstream including the video data. In some examples, the process of obtaining the encoded video bitstream can be performed by a decoding device. The video data can include a plurality of pictures, and the pictures can be divided into a plurality of blocks, as previously described. The video data can also include motion information for the pictures and/or blocks, which can be used to perform motion compensation.

At 704, the process 700 includes determining that an intra-subpartitions split flag is not present in the video bitstream for a current block of video data, the intra-subpartitions split flag specifying whether a type of split for an intra-subpartitions mode used for the current block is horizontal or vertical. For example, the ISP mode flag for the coding block 402, intra_subpartitions_mode_flag, may have been signaled when the cbWidth or the cbHeight is less than or equal to the size threshold MaxTbSizeY or if both the cbWidth and the cbHeight are less than or equal to MaxTbSizeY. Accordingly in examples where one of the cbWidth or the cbHeight is larger than MaxTbSizeY and the other is smaller, the intra_subpartitions_mode_flag would be signaled as true (with a value indicating that the ISP mode is enabled for the coding block). In such implementations, where one of the cbWidth or the cbHeight is greater than MaxTbSizeY, the intra-subpartitions split flag, intra_subpartitions_split_flag, may not be present in the signaled bitstream.

At 706, the process 700 includes determining that at least one of a width and a height of the current block is greater than a size threshold corresponding to a maximum transform block size. For example, when the intra_subpartitions_split_flag is not present for the coding block 402, either cbWidth or cbHeight may be determined to be greater than MaxTbSizeY.

At 708, the process 700 includes determining a value for the intra-subpartitions split flag for the current block based on whether the width or the height of the current block is greater than the size threshold. For example, if cbWidth is greater than MaxTbSizeY, then intra_subpartitions_split_flag may be inferred to be equal to a first value (e.g., a value of 1 corresponding to the ISP vertical split ISP_VER_SPLIT) for the coding block 402. On the other hand, if cbHeight is greater than MaxTbSizeY, then intra_subpartitions_split_flag may be inferred to be equal to a second value (e.g., a value of 0 corresponding to the ISP horizontal split ISP_HOR_SPLIT) for the coding block 402.

FIG. 8 is a flowchart illustrating an example of a process 800 of decoding video data by defining partitioning structures for the ISP mode to ensure that dimensions of sub-blocks obtained from splitting a coding block comply with size thresholds. At 802, the process 800 includes obtaining an encoded video bitstream including the video data. In some examples, the process of obtaining the encoded video bitstream can be performed by a decoding device. The video data can include a plurality of pictures, and the pictures can be divided into a plurality of blocks, as previously described. The video data can also include motion information for the pictures and/or blocks, which can be used to perform motion compensation.

At 804, the process 800 includes determining that determining that an intra-subpartition mode for partitioning a current block of the video data is enabled for the current block. For example, the ISP mode flag for the coding block 402, intra_subpartitions_mode_flag, may be signaled when the cbWidth or the cbHeight is less than or equal to the size threshold MaxTbSizeY or if both the cbWidth and the cbHeight are less than or equal to MaxTbSizeY. Accordingly in examples where one of the cbWidth or the cbHeight is larger than MaxTbSizeY and the other is smaller, the intra_subpartitions_mode_flag is signaled with a value (e.g., a value of 1) indicating that the ISP mode is enabled for the coding block. In some examples, if a dimension (width or height) of a sub-block resulting from splitting the coding block into sub-blocks using the ISP mode is greater than the size threshold MaxTbSizeY, then the intra_subpartitions_mode_flag may not be signaled.

At 806, the process 800 includes determining a partitioning structure for partitioning the current block into sub-blocks, wherein dimensions of the sub-blocks resulting from the partitioning do not exceed a size threshold. For example, in some implementations a recursive structure according to a modified transform_tree( ) syntax structure shown in Table 4′ or Table 4″ can be used to partition the sub-blocks obtained from partitioning the coding block 402 if the dimensions of the sub-blocks exceed the size threshold. For example, if the width or height of the sub-blocks exceeds MaxTbSizeY, vertical or horizontal split types can be used for partitioning the resulting sub-blocks recursively until sub-blocks of dimensions which do not exceed the MaxTb-SizeY size threshold are obtained.

FIG. 9 is a flowchart illustrating an example of a process 900 of encoding video data by determining whether the ISP mode is to be enabled for a coding block based on whether the coding block violates one or more constraints (e.g., crosses VPDU boundaries). At 902, the process 900 includes obtaining a current block of a picture of video data. In some examples, the video data can include un-encoded video data, such as when the process 900 is performed by an encoding device. The video data can include a plurality of pictures, and the pictures can be divided into a plurality of blocks, as previously described. The process 900 can determine motion information for the pictures and/or blocks, which can be used to perform motion compensation.

At 904, the process 900 includes determining whether at least one of a width of the current block of the picture is greater than a width size threshold and a height of the current block is greater than a height size threshold, the width size threshold corresponding to a width of a data unit and the height size threshold corresponding to a height of the data unit. In some cases, the data unit is a Virtual Pipeline Data Unit (VPDU). In some cases, the data unit is a transform block. In cases in which the data unit is a transform block, the width size threshold and the height size threshold can be defined as being equal to a maximum transform block size (e.g., MaxTbSizeY). In one illustrative example when the data unit is a VPDU, referring to FIG. 5, the cbWidth and cbHeight of the first block 520 may be compared with the SizeV_width and the SizeV_Height, respectively, of the VPDU 500 to determine whether at least one of cbWidth is greater than SizeV_width or cbHeight is greater than SizeV_height. In another example, referring to FIG. 6, the cbWidth and cbHeight of the coding block 602 may be compared with the SizeV (for the width dimension) and the SizeV (for the height dimension), respectively, of the VPDU 630 (where the width size threshold is equal to the height size threshold, equal to SizeV), to determine whether cbWidth is greater than SizeV or cbHeight is greater than SizeV.

At 906, the process 900 includes determining whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the ISP mode is applied to the current block to partition the current block into rectangular transform block subpartitions. In the example of FIG. 6, both the cbWidth and the cbHeight of the coding block 602 are greater than the SizeV of each of the four VPDUs 630-634. Thus, the dimensions of the coding block 602 would violate the one or more VPDU constraints for the coding block 602 to be coded with ISP mode. As previously noted, bitstream conformance can include a requirement that when cbWidth or cbHeight a coding block is greater than SizeV, the value of intra_subpartitions_mode_flag shall be equal to 0. In such examples, the intra-subpartition mode is not allowed for the current block when the width of the current block is greater than the width size threshold or the height of the current block is greater than the height size threshold. In such examples, an intra_subpartition_mode_flag is not signaled in the encoded video bitstream from the encoding device when the intra-subpartition mode is not allowed for the coding block and a value of the intra_subpartition_mode_flag may be inferred to be a first value (0) by a decoding device, the first value indicative of the intra-subpartition mode not being allowed for the coding block.

At block 908, the process 900 includes generating, based on determining whether the intra-subpartitions mode flag is to be signaled for the current block, an encoded video bitstream including at least the current block. For example, the encoded bitstream can include the current block and the intra_subpartitions_mode_flag indicating that the ISP mode is enabled for the current block when the current block does not violate the VPDU constraint.

In the example of FIG. 5, when both cbWidth and the cbHeight are less than or equal to the size thresholds corresponding to the VPDU boundaries, the syntax element intra_subpartitions_mode_flag can be signaled with a value indicating whether the ISP mode is enabled for the first block 520 (e.g., a value of 1 or "true" indicating ISP mode is enabled for the first block 520 or a value of 0 or "false" indicating ISP mode is not performed for the first block 520). In some examples, based on determining that the intra-subpartition mode is enabled, the process 700 can be used for determining the value of the intra-subpartitions split flag when the intra-subpartitions split flag is not signaled.

In some implementations, the processes (or methods) described herein, including processes 700, 800, and 900, can be performed by a computing device or an apparatus, such as the system 100 shown in FIG. 1. For example, the processes can be performed by the encoding device 104 shown in FIG. 1 and FIG. 10, by another video source-side device or video transmission device, by the decoding device 112 shown in FIG. 1 and FIG. 11, and/or by another client-side device, such as a player device, a display, or any other client-side device. In some examples, the computing device or apparatus may include a camera configured to capture video data (e.g., a video sequence) including video frames. In some examples, a camera or other capture device that captures the video data is separate from the computing device, in which case the computing device receives or obtains the captured video data.

In some cases, the computing device or apparatus may include one or more input devices, one or more output devices, one or more processors, one or more microprocessors, one or more microcomputers, and/or other component(s) that is/are configured to carry out the steps of the processes described herein. In some examples, the computing device may include a mobile device, a desktop computer, a server computer and/or server system, or other type of computing device. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 700, 800, 900 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein, including processes 800 and 900, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 10:
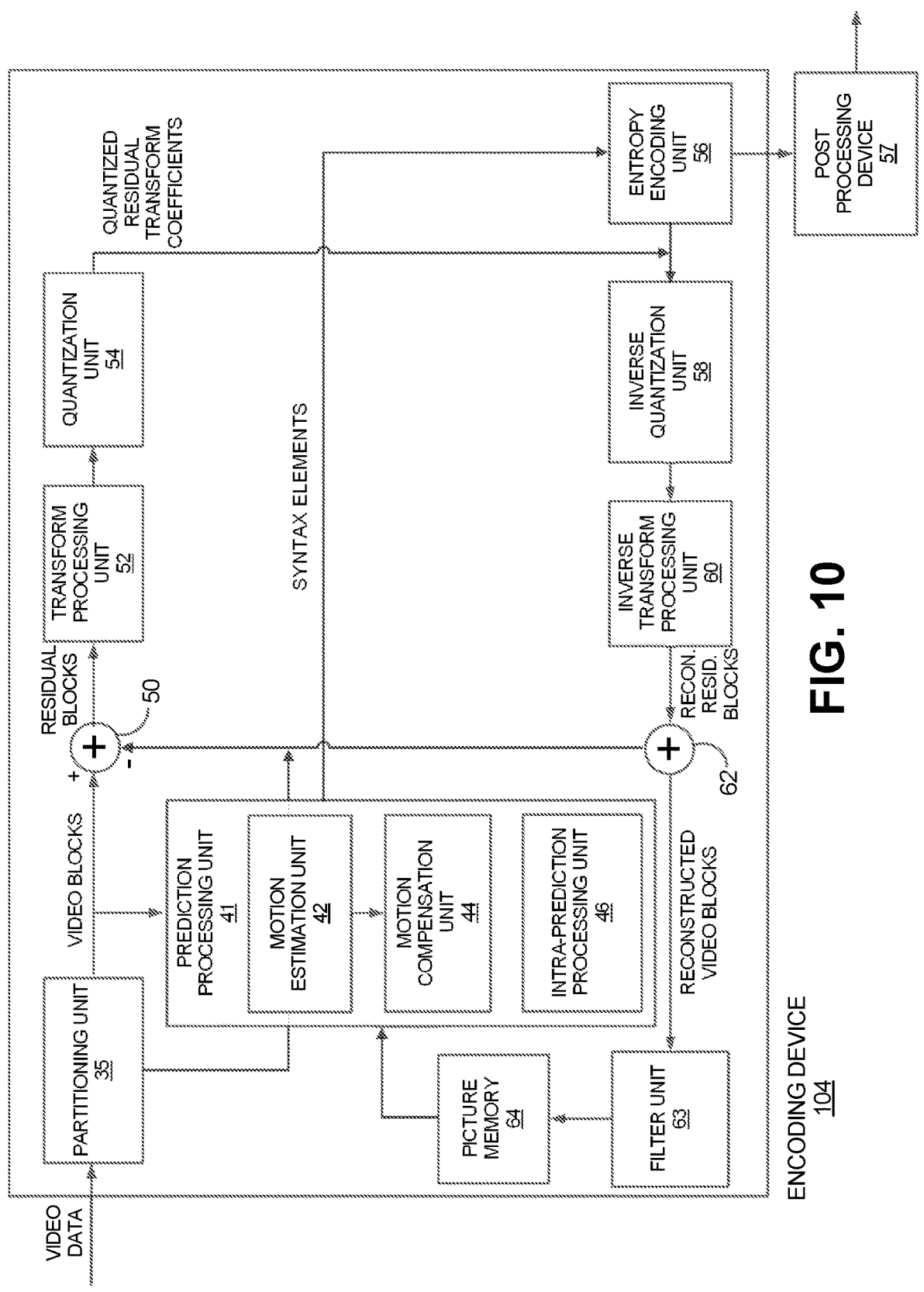
FIG. 10 is a block diagram illustrating an example video encoding device, in accordance with some examples.
Figure 11:
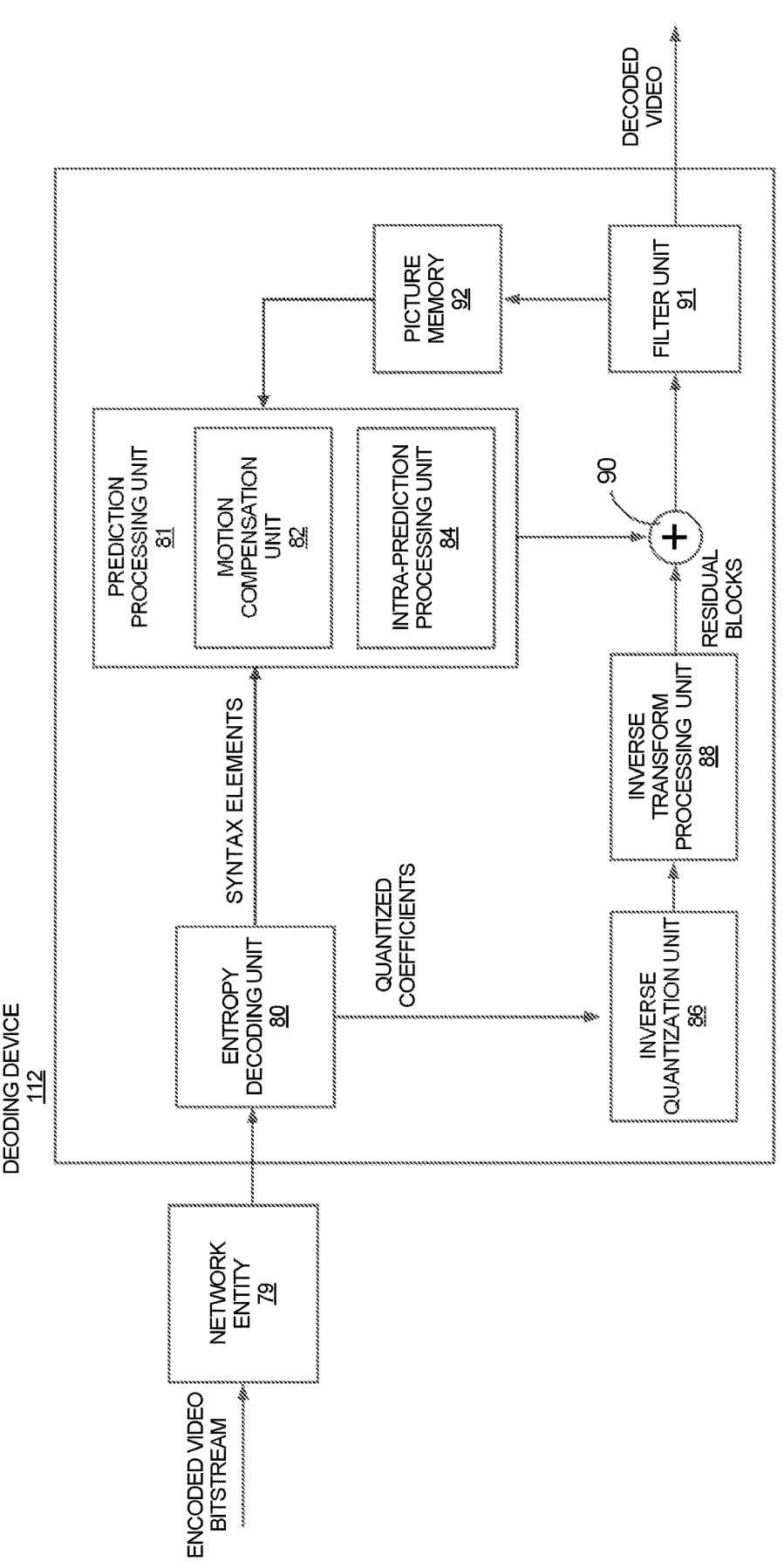
FIG. 11 is a block diagram illustrating an example video decoding device, in accordance with some examples.

Specific details of the encoding device 104 and the decoding device 112 are shown in FIG. 10 and FIG. 11, respectively. FIG. 10 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 10 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 10, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 10 represents an example of a video encoder configured to perform any of the techniques described herein, including the processes described above with respect to FIG. 7, FIG.

8 and/or FIG. 9. In some cases, some of the techniques of this disclosure may also be implemented by post processing device 57.

FIG. 11 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 11.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 11 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 11 represents an example of a video decoder configured to perform any of the techniques described herein, including the processes described above with respect to FIG. 8 and/or FIG. 9.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1: A method of processing video data, the method comprising: obtaining a current block of the video data; determining at least one of a width and a height of the current block is greater than a size threshold; determining a subpartitions split flag is not present for the current block; and determining a value for the subpartitions split flag for the current block, the subpartitions split flag defining a split of the current block, wherein the value for the subpartitions split flag is determined based on whether the width or the height of the current block is greater than the size threshold.

Example 2: The method of claim 1, wherein the subpartitions split flag is determined to have a first value when the width of the current block is greater than the size threshold, the first value corresponding to a vertical split.

Example 3: The method of any one of Examples 1 to 2, wherein the subpartitions split flag is determined to have a second value when the height of the current block is greater than the size threshold, the second value corresponding to a horizontal split.

Example 4: The method of Example 1, wherein the subpartitions split flag is determined to have a first value when the width of the current block is greater than the size threshold and the height of the current block is less than the size threshold, the first value corresponding to a vertical split.

Example 5: The method of any one of Examples 1 or 4, wherein the subpartitions split flag is determined to have a second value when the height of the current block is greater than the size threshold and the width of the current block is less than the size threshold, the second value corresponding to a horizontal split.

Example 6: The method of any one of Examples 1 to 5, wherein the subpartitions split flag is not signaled based on at least one of the width and the height of the current block being greater than the size threshold.

Example 7: The method of any one of Examples 1 to 6, further comprising: dividing the current block vertically or horizontally into sub-partitions based on the subpartitions split flag.

Example 8: The method of any one of Examples 1 to 7, wherein the current block is an intra-predicted block.

Example 9: The method of any one of Examples 1 to 8, wherein the current block is a luma intra-predicted block.

Example 10. An apparatus comprising a memory configured to store video data and a processor configured to process the video data according to any of Examples 1 to 9.

Example 11: The apparatus of Example 10, wherein the apparatus includes a decoder.

Example 12: The apparatus of Example 10, wherein the apparatus includes an encoder.

Example 13: The apparatus of any one of Examples 10 to 12, wherein the apparatus is a mobile device.

Example 14: The apparatus of any one of Examples 10 to 13, wherein the apparatus includes a display configured to display the video data.

Example 15: The apparatus of any one of Examples 10 to 14, wherein the apparatus includes a camera configured to capture one or more pictures.

Example 16: A computer readable medium having stored thereon instructions that when executed by a processor perform the methods of any of Examples 1 to 9.

Example 17: A method of processing video data, the method comprising: obtaining a current block of the video data; determining at least one of a width and a height of the current block is greater than a size threshold; and partitioning the current block into subpartitions, wherein the current block is partitioned until widths and heights of the subpartitions do not exceed the size threshold.

Example 18: The method of Example 17, wherein partitioning the current block includes reducing at least one of the width and the height that exceeds the size threshold.

Example 19: The method of any one of Examples 17 to 18, wherein partitioning the current block into subpartitions includes using a transform tree syntax structure when a sub-partition split type is horizontal or vertical.

Example 20: The method of any one of Examples 17 to 18, further comprising modifying a value of a subpartition number variable when at least one of the width and height of the coded block is greater than the size threshold, the subpartition number variable specifying a number of subpartitions a block is divided into, wherein the modified value causes at least one of the width and height of the subpartitions to not exceed the size threshold.

Example 21: The method of any one of Examples 17 to 18, wherein a value of a subpartitions mode flag associated with the current block constrains a subpartition not to exceed the size threshold for at least one of width and height, the subpartitions mode flag specifying whether the current block is partitioned into a number of block subpartitions.

Example 22: The method of Example 21, wherein the number of block subpartitions is specified by a subpartition number variable.

Example 23: An apparatus comprising a memory configured to store video data and a processor configured to process the video data according to any of Examples 17-22.

Example 24: The apparatus of Example 23, wherein the apparatus includes a decoder.

Example 25: The apparatus of Example 23, wherein the apparatus includes an encoder.

Example 26: The apparatus of any one of Examples 23 to 25, wherein the apparatus is a mobile device.

Example 27: The apparatus of any one of Examples 23 to 26, wherein the apparatus includes a display configured to display the video data.

Example 28: The apparatus of any one of Examples 23 to 27, wherein the apparatus includes a camera configured to capture one or more pictures.

Example 29: A computer readable medium having stored thereon instructions that when executed by a processor perform the methods of any of Examples 17-22.

Example 30: A method of processing video data, the method comprising: obtaining a current block of the video data; and coding the current block based on a constraint, the constraint specifying that the current block does not cross a Virtual Pipeline Data Units (VPDU) boundary.

Example 31: The apparatus of Example 30, wherein the constraint specifies that, when at least one of a width and a height of the current block is greater than a maximum width or height of a VPDU, a value of a subpartitions mode flag associated with the current block shall be equal to a particular value, the particular value specifying the current block is not partitioned into block subpartitions.

Example 32: An apparatus comprising a memory configured to store video data and a processor configured to process the video data according to any of Examples 30-31.

Example 33: The apparatus of Example 32, wherein the apparatus includes a decoder.

Example 34: The apparatus of Example 32, wherein the apparatus includes an encoder.

Example 35: The apparatus of any one of Examples 32 to 34, wherein the apparatus is a mobile device.

Example 36: The apparatus of any one of Examples 32 to 35, wherein the apparatus includes a display configured to display the video data.

Example 37: The apparatus of any one of Examples 32 to 36, wherein the apparatus includes a camera configured to capture one or more pictures.

Example 38: A computer readable medium having stored thereon instructions that when executed by a processor perform the methods of any of Examples 30-31.

Clause 1: An apparatus for encoding video data, the apparatus comprising: a memory; and a processor implemented in circuitry and configured to: obtain a current block of a picture of video data; determine whether at least one of a width of the current block of the picture is greater than a width size threshold and a height of the current block is greater than a height size threshold, the width size threshold corresponding to a width of a data unit and the height size threshold corresponding to a height of the data unit; determine whether an intra-subpartitions mode flag is to be signaled for the current block based on whether at least one of the width of the current block is greater than the width size threshold and the height of the current block is greater than the height size threshold, wherein a value of the intra-subpartitions mode flag indicates whether the current block is partitioned into rectangular transform block subpartitions; and generate, based on determining whether the intra-subpartitions mode flag is to be signaled for the current block, an encoded video bitstream including at least the current block.

Clause 2: The apparatus according to Clause 1, wherein the width size threshold is equal to the height size threshold.

Clause 3: The apparatus according to any of Clauses 1-2, wherein the width size threshold is different than the height size threshold.

Clause 4: The apparatus according to any of Clauses 1-3, wherein a value of the intra-subpartitions mode flag being equal to a first value specifies that the current block is partitioned into rectangular transform block subpartitions, and the value of the intra-subpartitions mode flag being equal to a second value specifies that the current block is not partitioned into rectangular transform block subpartitions.

Clause 5: The apparatus according to any of Clauses 1-4, wherein the processor is further configured to: determine the width of the current block is greater than the width size threshold or the height of the current block is greater than the height size threshold; and based on the determination that the width of the current block is greater than the width size threshold or the height of the current block is greater than the height size threshold, determine the value of the intra-subpartitions mode flag for the current block to be equal to the second value.

Clause 6: The apparatus according to any of Clauses 1-5, wherein the processor is further configured to: determine the width of the current block is less than or equal to the width size threshold and the height of the current block is less than or equal to the height size threshold; and based on the determination that the width of the current block is less than or equal to the width size threshold and the height of the current block is less than or equal to the height size threshold, determine to signal the intra-subpartitions mode flag for the current block (e.g., as the first value or the second value).

Clause 7: The apparatus according to any of Clauses 1-6, wherein the processor is further configured to: determine the width of the current block is less than or equal to a size threshold and the height of the current block is less than or equal to the size threshold, the size threshold corresponding to a maximum transform block size; and based on the determination that the width of the current block is less than or equal to the size threshold and the height of the current block is less than or equal to the size threshold, determine to signal the intra-subpartitions mode flag for the current block (e.g., as the first value or the second value).

Clause 8: The apparatus according to any of Clauses 1-7, wherein the processor is further configured to: determine the width of the current block is less than or equal to a size threshold or the height of the current block is less than or equal to the size threshold, the size threshold corresponding to a maximum transform block size; and based on the determination that the width of the current block is less than or equal to the size threshold or the height of the current block is less than or equal to the size threshold, determine that the value of the intra-subpartitions mode flag for the current block is the second value.

Clause 9: The apparatus according to any of Clauses 1-8, wherein the processor is further configured to: determine the intra-subpartitions mode flag is to be signaled for the current block; and based on the determination that the intra-subpartitions mode flag is to be signaled for the current block, include the intra-subpartitions mode flag for the current block in the encoded video bitstream.

Clause 10: The apparatus according to any of Clauses 1-9, wherein the processor is further configured to: determine that at least one of a width and a height of the current block is greater than a size threshold corresponding to a maximum transform block size; and based on the determination that the width or the height of the current block is greater than the size threshold corresponding to the maximum transform block size, determine a value for an intra-subpartitions split flag for the current block, the intra-subpartitions split flag specifying whether a type of split for partitioning the current block is horizontal or vertical.

Clause 11: The apparatus according to any of Clauses 1-10, wherein the processor is further configured to: determine the width of the current block is greater than the size threshold; and based on the determination that the width of the current block is greater than the size threshold, determine a first split value for the intra-subpartitions split flag, the first split value corresponding to a vertical split type.

Clause 12: The apparatus according to any of Clauses 1-11, wherein the processor is further configured to: determine the height of the current block is greater than the size threshold; and based on the determination that the height of the current block is greater than the size threshold, determine a second split value for the intra-subpartitions split flag, the second split value corresponding to a horizontal split type.

Clause 13: The apparatus according to any of Clauses 1-12, wherein the processor is further configured to: divide the current block vertically or horizontally into sub-partitions based on the value of the intra-subpartitions split flag for the current block.

Clause 14: The apparatus according to any of Clauses 1-13, wherein the current block is an intra-predicted block.

Clause 15: The apparatus according to any of Clauses 1-14, wherein the data unit is a Virtual Pipeline Data Unit (VPDU).

Clause 16: The apparatus according to any of Clauses 1-15, wherein the data unit is a transform block.

Clause 17: The apparatus according to any of Clauses 1-16, wherein the width size threshold and the height size threshold are equal to a maximum transform block size.

Clause 18: A method of decoding video data, the method comprising: obtaining an encoded video bitstream including video data; determining that an intra-subpartitions split flag is not present in the encoded video bitstream for a current block of video data, the intra-subpartitions split flag specifying whether a type of split for an intra-subpartitions mode used for the current block is horizontal or vertical; determining that at least one of a width and a height of the current block is greater than a size threshold corresponding to a maximum transform block size; and determining a value for the intra-subpartitions split flag for the current block based on whether the width or the height of the current block is greater than the size threshold.

Clause 19: The method according to Clause 18, further comprising: determining an intra-subpartitions mode flag is enabled for the current block; and determining that the intra-subpartitions split flag is not present in the encoded video bitstream based on the determination that the intra-subpartitions mode flag is enabled for the current block, wherein the current block is partitioned into rectangular transform block subpartitions using the intra-subpartitions mode based on the intra-subpartitions mode flag being enabled for the current block.

Clause 20: The method according to any of Clauses 18-19, further comprising: determining the width of the current block is greater than the size threshold; and based on the determination that the width of the current block is greater than the size threshold, determining a first split value for the intra-subpartitions split flag, the first split value corresponding to a vertical split type.

Clause 21: The method according to any of Clauses 18-20, further comprising: splitting the current block into two or more sub-blocks using the vertical split type, wherein respective widths of each of the two or more sub-blocks are smaller than the width of the current block based on the vertical split type.

Clause 22: The method according to any of Clauses 18-21, further comprising: determining the height of the current block is greater than the size threshold; and based on the determination that the height of the current block is greater than the size threshold, determining a second split value for the intra-subpartitions split flag, the second split value corresponding to a horizontal split type.

Clause 23: The method according to any of Clauses 18-22, further comprising: splitting the current block into two or more sub-blocks using the horizontal split type, wherein respective heights of each of the two or more sub-blocks are smaller than the height of the current block based on the horizontal split type.

Clause 24: The method according to any of Clauses 18-23, further comprising: determining that an intra-subpartitions mode flag for enabling the intra-subpartitions mode for a second block of the video data is not present in the encoded video bitstream; and determining a mode value of the intra-subpartitions mode flag for the second block based on the intra-subpartitions mode flag not being present in the encoded video bitstream for the second block.

Clause 25: The method according to any of Clauses 18-24, wherein the intra-subpartitions mode flag not being present in the encoded video bitstream for the second block is indicative of at least one of a width of the second block being greater than a width size threshold or a height of the second block being greater than a height size threshold, the width size threshold corresponding to a width of a data unit and the height size threshold corresponding to a height of the data unit.

Clause 26: The method according to any of Clauses 18-25, wherein the width size threshold is equal to the height size threshold.

Clause 27: The method according to any of Clauses 18-26, wherein the width size threshold is not equal to the height size threshold.

Clause 28: The method according to any of Clauses 18-27, wherein the data unit is a Virtual Pipeline Data Unit (VPDU).

Clause 29: The method according to any of Clauses 18-28, wherein the data unit is a transform block.

Clause 30: The method according to any of Clauses 18-29, wherein the width size threshold and the height size threshold are equal to a maximum transform block size.

Clause 31: The method according to any of Clauses 18-30, wherein the current block is an intra-predicted block.

Clause 32: The method according to any of Clauses 18-31, further comprising: performing block-based partitioning of a block of video data to generate one or more coding blocks including the current block; determining the intra-subpartitions mode is enabled for the current block; and based on determining the intra-subpartitions mode is enabled for the current block, partitioning the current block into two or more sub-blocks using the intra-subpartitions mode.

Clause 33: The method according to any of Clauses 18-32, further comprising: reconstructing the two or more sub-blocks by applying respective two or more residual values to the two or more sub-blocks.

Clause 34: An apparatus for decoding video data, the apparatus comprising: a memory; and a processor implemented in circuitry and configured to: obtain an encoded video bitstream including video data; determine that an intra-subpartitions split flag is not present in the encoded video bitstream for a current block of video data, the intra-subpartitions split flag specifying whether a type of split for an intra-subpartitions mode used for the current block is horizontal or vertical; determine that at least one of a width and a height of the current block is greater than a size threshold corresponding to a maximum transform block size; and determine a value for the intra-subpartitions split flag for the current block based on whether the width or the height of the current block is greater than the size threshold.

Clause 35: The apparatus according to Clause 34, wherein the processor is further configured to: determine an intra-subpartitions mode flag is enabled for the current block; and determine that the intra-subpartitions split flag is not present in the encoded video bitstream based on the determination that the intra-subpartitions mode flag is enabled for the current block, wherein the current block is partitioned into rectangular transform block subpartitions using the intra-subpartitions mode based on the intra-subpartitions mode flag being enabled for the current block.

Clause 36: The apparatus according to any of Clauses 34-35, wherein the processor is further configured to: determine the width of the current block is greater than the size threshold; and based on the determination that the width of the current block is greater than the size threshold, determine a first split value for the intra-subpartitions split flag, the first split value corresponding to a vertical split type.

Clause 37: The apparatus according to any of Clauses 34-36, wherein the processor is further configured to: split the current block into two or more sub-blocks using the vertical split type, wherein respective widths of each of the two or more sub-blocks are smaller than the width of the current block based on the vertical split type.

Clause 38: The apparatus according to any of Clauses 34-37, wherein the processor is further configured to: determine the height of the current block is greater than the size threshold; and based on the determination that the height of the current block is greater than the size threshold, determine a second split value for the intra-subpartitions split flag, the second split value corresponding to a horizontal split type.

Clause 39: The apparatus according to any of Clauses 34-38, wherein the processor is further configured to: split the current block into two or more sub-blocks using the horizontal split type, wherein respective heights of each of the two or more sub-blocks are smaller than the height of the current block based on the horizontal split type.

Clause 40: The apparatus according to any of Clauses 34-39, wherein the processor is further configured to: determine that an intra-subpartitions mode flag for enabling the intra-subpartitions mode for a second block of the video data is not present in the encoded video bitstream; and determine a mode value of the intra-subpartitions mode flag for the second block based on the intra-subpartitions mode flag not being present in the encoded video bitstream for the second block.

Clause 41: The apparatus according to any of Clauses 34-40, wherein the intra-subpartitions mode flag not being present in the encoded video bitstream for the second block is indicative of at least one of a width of the second block being greater than a width size threshold or a height of the second block being greater than a height size threshold, the width size threshold corresponding to a width of a Virtual Pipeline Data Unit (VPDU) and the height size threshold corresponding to a height of the VPDU.

Clause 42: The apparatus according to any of Clauses 34-41, wherein the width size threshold is equal to the height size threshold.

Clause 43: The apparatus according to any of Clauses 34-42, wherein the width size threshold is not equal to the height size threshold.

Clause 44: The apparatus according to any of Clauses 34-43, wherein the data unit is a Virtual Pipeline Data Unit (VPDU).

Clause 45: The apparatus according to any of Clauses 34-44, wherein the data unit is a transform block.

Clause 46: The apparatus according to any of Clauses 34-45, wherein the width size threshold and the height size threshold are equal to a maximum transform block size.

Clause 47: The apparatus according to any of Clauses 34-43, wherein the current block is an intra-predicted block.

Clause 48: The apparatus according to any of Clauses 34-44, wherein the processor is further configured to: perform block-based partitioning of a block of video data to generate one or more coding blocks including the current block; determine the intra-subpartitions mode is enabled for the current block; and based on determining the intra-subpartitions mode is enabled for the current block, partition the current block into two or more sub-blocks using the intra-subpartitions mode.

Clause 49: The apparatus according to any of Clauses 34-48, wherein the processor is further configured to: reconstruct the two or more sub-blocks by applying respective two or more residual values to the two or more sub-blocks.

Clause 50: The apparatus according to any of Clauses 34-49, wherein the apparatus comprises a mobile device with a camera for capturing one or more pictures.

Clause 51: The apparatus according to any of Clauses 34-50, further comprising a display for displaying one or more pictures.

Clause 52: A non-transitory computer-readable medium having stored thereon instructions that, when executed by one or more processors, cause the one or more processors to: obtain an encoded video bitstream including video data; determine that an intra-subpartitions split flag is not present in the encoded video bitstream for a current block of video data, the intra-subpartitions split flag specifying whether a type of split for an intra-subpartitions mode used for the current block is horizontal or vertical; determine that at least one of a width and a height of the current block is greater than a size threshold corresponding to a maximum transform block size; and determine a value for the intra-subpartitions split flag for the current block based on whether the width or the height of the current block is greater than the size threshold.

Clause 53: The non-transitory computer-readable medium according to Clause 52, wherein the instructions further cause the processor to: determine an intra-subpartitions mode flag is enabled for the current block; and determine that the intra-subpartitions split flag is not present in the encoded video bitstream based on the determination that the intra-subpartitions mode flag is enabled for the current block, wherein the current block is partitioned into rectangular transform block subpartitions using the intra-subpartitions mode based on the intra-subpartitions mode flag being enabled for the current block.

Clause 54: The non-transitory computer-readable medium according to any of Clauses 52-53, wherein the instructions further cause the processor to: determine the width of the current block is greater than the size threshold; and based on the determination that the width of the current block is greater than the size threshold, determine a first split value for the intra-subpartitions split flag, the first split value corresponding to a vertical split type.

Clause 55: The non-transitory computer-readable medium according to any of Clauses 52-54, wherein the instructions further cause the processor to: split the current block into two or more sub-blocks using the vertical split type, wherein respective widths of each of the two or more sub-blocks are smaller than the width of the current block based on the vertical split type.

Clause 56: The non-transitory computer-readable medium according to any of Clauses 52-55, wherein the instructions further cause the processor to: determine the height of the current block is greater than the size threshold; and based on the determination that the height of the current block is greater than the size threshold, determine a second split value for the intra-subpartitions split flag, the second split value corresponding to a horizontal split type.

Clause 57: The non-transitory computer-readable medium according to any of Clauses 52-56, wherein the instructions further cause the processor to: split the current block into two or more sub-blocks using the horizontal split type, wherein respective heights of each of the two or more sub-blocks are smaller than the height of the current block based on the horizontal split type.

Clause 58: The non-transitory computer-readable medium according to any of Clauses 52-57, wherein the instructions further cause the processor to: determine that an intra-subpartitions mode flag for enabling the intra-subpartitions mode for a second block of the video data is not present in the encoded video bitstream; and determine a mode value of the intra-subpartitions mode flag for the second block based on the intra-subpartitions mode flag not being present in the encoded video bitstream for the second block.

Clause 59: The non-transitory computer-readable medium according to any of Clauses 52-58, wherein the intra-subpartitions mode flag not being present in the encoded video bitstream for the second block is indicative of at least one of a width of the second block being greater than a width size threshold or a height of the second block being greater than a height size threshold, the width size threshold corresponding to a width of a Virtual Pipeline Data Unit (VPDU) and the height size threshold corresponding to a height of the VPDU.

Clause 60: The non-transitory computer-readable medium according to any of Clauses 52-59, wherein the width size threshold is equal to the height size threshold.

Clause 61: The non-transitory computer-readable medium according to any of Clauses 52-60, wherein the width size threshold is not equal to the height size threshold.

Clause 62: The non-transitory computer-readable medium according to any of Clauses 52-61, wherein the data unit is a Virtual Pipeline Data Unit (VPDU).

Clause 64: The non-transitory computer-readable medium according to any of Clauses 52-62, wherein the data unit is a transform block.

Clause 65: The non-transitory computer-readable medium according to any of Clauses 52-63, wherein the width size threshold and the height size threshold are equal to a maximum transform block size.

Clause 66: The non-transitory computer-readable medium according to any of Clauses 52-64, wherein the current block is an intra-predicted block.

Clause 67: The non-transitory computer-readable medium according to any of Clauses 52-65, wherein the instructions further cause the processor to: perform block-based partitioning of a block of video data to generate one or more coding blocks including the current block; determine the intra-subpartitions mode is enabled for the current block; and based on determining the intra-subpartitions mode is enabled for the current block, partition the current block into two or more sub-blocks using the intra-subpartitions mode.

Clause 68: The non-transitory computer-readable medium according to any of Clauses 52-66, wherein the instructions further cause the processor to: reconstruct the two or more sub-blocks by applying respective two or more residual values to the two or more sub-blocks.

Clause 69: An apparatus for decoding video data, the apparatus comprising: means for obtaining an encoded video bitstream including video data; means for determining that an intra-subpartitions split flag is not present in the encoded video bitstream for a current block of video data, the intra-subpartitions split flag specifying whether a type of split for an intra-subpartitions mode used for the current block is horizontal or vertical; means for determining that at least one of a width and a height of the current block is greater than a size threshold corresponding to a maximum transform block size; and means for determining a value for the intra-subpartitions split flag for the current block based on whether the width or the height of the current block is greater than the size threshold.

Clause 70: The apparatus according to Clause 69, further comprising: means for determining an intra-subpartitions mode flag is enabled for the current block; and means for determining that the intra-subpartitions split flag is not present in the encoded video bitstream based on the determination that the intra-subpartitions mode flag is enabled for the current block, wherein the current block is partitioned into rectangular transform block subpartitions using the intra-subpartitions mode based on the intra-subpartitions mode flag being enabled for the current block.

Clause 71: The apparatus according to any of Clauses 69-70, further comprising: means for determining the width of the current block is greater than the size threshold; and based on the determination that the width of the current block is greater than the size threshold, means for determining a first split value for the intra-subpartitions split flag, the first split value corresponding to a vertical split type.

Clause 72: The apparatus according to any of Clauses 69-71, further comprising: means for splitting the current block into two or more sub-blocks using the vertical split type, wherein respective widths of each of the two or more sub-blocks are smaller than the width of the current block based on the vertical split type.

Clause 73: The apparatus according to any of Clauses 69-72, further comprising: means for determining the height of the current block is greater than the size threshold; and based on the determination that the height of the current block is greater than the size threshold, means for determining a second split value for the intra-subpartitions split flag, the second split value corresponding to a horizontal split type.

Clause 74: The apparatus according to any of Clauses 69-73, further comprising: means for splitting the current block into two or more sub-blocks using the horizontal split type, wherein respective heights of each of the two or more sub-blocks are smaller than the height of the current block based on the horizontal split type.

Clause 75: The apparatus according to any of Clauses 69-74, further comprising: means for determining that an intra-subpartitions mode flag for enabling the intra-subpartitions mode for a second block of the video data is not present in the encoded video bitstream; and means for determining a mode value of the intra-subpartitions mode flag for the second block based on the intra-subpartitions mode flag not being present in the encoded video bitstream for the second block.

Clause 76: The apparatus according to any of Clauses 69-75, wherein the intra-subpartitions mode flag not being present in the encoded video bitstream for the second block is indicative of at least one of a width of the second block being greater than a width size threshold or a height of the second block being greater than a height size threshold, the width size threshold corresponding to a width of a Virtual Pipeline Data Unit (VPDU) and the height size threshold corresponding to a height of the VPDU.

Clause 77: The apparatus according to any of Clauses 69-76, wherein the width size threshold is equal to the height size threshold.

Clause 78: The apparatus according to any of Clauses 69-77, wherein the width size threshold is not equal to the height size threshold.

Clause 79: The apparatus according to any of Clauses 69-78, wherein the data unit is a Virtual Pipeline Data Unit (VPDU).

Clause 80: The apparatus according to any of Clauses 69-79, wherein the data unit is a transform block.

Clause 81: The apparatus according to any of Clauses 69-80, wherein the width size threshold and the height size threshold are equal to a maximum transform block size.

Clause 82: The apparatus according to any of Clauses 69-81, wherein the current block is an intra-predicted block.

Clause 83: The apparatus according to any of Clauses 69-82, further comprising: means for performing block-based partitioning of a block of video data to generate one or more coding blocks including the current block; means for determining the intra-subpartitions mode is enabled for the current block; and based on determining the intra-subpartitions mode is enabled for the current block, means for partitioning the current block into two or more sub-blocks using the intra-subpartitions mode.

Clause 84: The apparatus according to any of Clauses 69-83, further comprising: means for reconstructing the two or more sub-blocks by applying respective two or more residual values to the two or more sub-blocks.

What is claimed is:

1. An apparatus for decoding video data, the apparatus comprising:

a memory; and a processor implemented in circuitry and configured to:

obtain a current block of a picture of video data;

determine that a width of the current block of the picture is greater than a value indicative of a maximum transform block size and determine that a height of the current block is less than or equal to the value indicative of the maximum transform block size;

determine that a first intra-subpartitions mode flag is not received for the current block based on the determination that the width of the current block is greater than the value indicative of a maximum transform block size and the determination that the height of the current block is less than or equal to the value indicative of the maximum transform block size, wherein the first intra-subpartitions mode flag indicates whether the current block is partitioned into rectangular transform block subpartitions; and process the current block based on the determination that the intra-subpartitions mode flag is not received for the current block.

2. The apparatus of claim 1, wherein the first intra-subpartitions mode flag being equal to a first value specifies that the current block is partitioned into rectangular transform block subpartitions, and the first intra-subpartitions mode flag being equal to a second value specifies that the current block is not partitioned into rectangular transform block subpartitions.

3. The apparatus of claim 2, wherein the processor is further configured to:

based on the determination that the first intra-subpartitions mode flag is not received for the current block, determine the value of the first intra-subpartitions mode flag for the current block to be equal to the second value.

4. The apparatus of claim 3, wherein the processor is further configured to:

obtain a second block of video data, the second block being different from the current block;

determine that a width of the second block is less than or equal to the value indicative of the maximum transform block size and determine that a height of the second block is greater than the value indicative of the maximum transform block size;

determine that a second intra-subpartitions mode flag is not received for the second block based on the determination that the width of the second block is less than or equal to the value indicative of the maximum transform block size and the determination that the height of the second block is greater than the value indicative of the maximum transform block size, wherein the second intra-subpartitions mode flag indicates whether the second block is partitioned into rectangular transform block subpartitions and wherein the second intra-subpartitions mode flag is different from the first intra-subpartitions mode flag; and process the second block based on the determination that the second intra-subpartitions mode flag is not received for the second block.

5. The apparatus of claim 4, wherein the processor is further configured to:

obtain a third block of video data, the third block being different from the current block and different from the second block;

determine that a width of the third block is less than or equal to the value indicative of the maximum transform block size and determine that a height of the third block is less than or equal to the value indicative of the maximum transform block size;

determine that a third intra-subpartitions mode flag is received for the third block based on the determination that the width of the third block is less than or equal to the value indicative of the maximum transform block size and the determination that the height of the third block is less than or equal to the value indicative of the maximum transform block size, wherein the third intra-subpartitions mode flag indicates whether the third block is partitioned into rectangular transform block subpartitions and wherein the third intra-subpartitions mode flag is different from the first intra-subpartitions mode flag and from the second intra-subpartitions mode flag; and based on the determination that that the third intra-subpartitions mode flag is received for the third block, determine a value for an intra-subpartitions split flag for the third block, the intra-subpartitions split flag specifying whether a type of split for partitioning the third block is horizontal or vertical.

6. The apparatus of claim 5, wherein the processor is further configured to:

divide the third block vertically or horizontally into sub-partitions based on the value of the intra-subpartitions split flag for the third block.

7. The apparatus of claim 1, wherein the current block is an intra-predicted block.

8. A method of decoding video data, the method comprising:

obtaining a current block of a picture of video data;

determining that a width of the current block of the picture is greater than a value indicative of a maximum transform block size and determine that a height of the current block is less than or equal to the value indicative of the maximum transform block size;

determining that a first intra-subpartitions mode flag is not received for the current block based on the determination that the width of the current block is greater than the value indicative of a maximum transform block size and the determination that the height of the current block is less than or equal to the value indicative of the maximum transform block size, wherein the first intra-subpartitions mode flag indicates whether the current block is partitioned into rectangular transform block subpartitions; and processing the current block based on the determination that the intra-subpartitions mode flag is not received for the current block.

9. The method of claim 8, wherein the first intra-subpartitions mode flag being equal to a first value specifies that the current block is partitioned into rectangular transform block subpartitions, and the first intra-subpartitions mode flag being equal to a second value specifies that the current block is not partitioned into rectangular transform block subpartitions.

10. The method of claim 9, further comprising:

based on the determination that the first intra-subpartitions mode flag is not received for the current block, determining the value of the first intra-subpartitions mode flag for the current block to be equal to the second value.

11. The method of claim 10, further comprising:

obtaining a second block of video data, the second block being different from the current block;

determining that a width of the second block is less than or equal to the value indicative of the maximum transform block size and determining that a height of the second block is greater than the value indicative of the maximum transform block size;

determining that a second intra-subpartitions mode flag is not received for the second block based on the determination that the width of the second block is less than or equal to the value indicative of a maximum transform block size and the determination that the height of the second block is greater than the value indicative of the maximum transform block size, wherein the second intra-subpartitions mode flag indicates whether the second block is partitioned into rectangular transform block subpartitions and wherein the second intra-subpartitions mode flag is different from the first intra-subpartitions mode flag; and process the second block based on the determination that the second intra-subpartitions mode flag is not received for the second block.

12. The method of claim 11, further comprising:

obtaining a third block of video data, the third block being different from the current block and different from the second block;

determining that a width of the third block is less than or equal to the value indicative of the maximum transform block size and determining that a height of the third block is less than or equal to the value indicative of the maximum transform block size;

determining that a third intra-subpartitions mode flag is received for the third block based on the determination that the width of the third block is less than or equal to the value indicative of the maximum transform block size and the determination that the height of the third block is less than or equal to the value indicative of the maximum transform block size, wherein the third intra-subpartitions mode flag indicates whether the third block is partitioned into rectangular transform block subpartitions and wherein the third intra-subpartitions mode flag is different from the first intra-subpartitions mode flag and from the second intra-subpartitions mode flag; and based on the determination that that the intra-subpartitions mode flag is received for the third block, determining a value for an intra-subpartitions split flag for the third block, the intra-subpartitions split flag specifying whether a type of split for partitioning the third block is horizontal or vertical.

13. The method of claim 12, further comprising:

dividing the third block vertically or horizontally into sub-partitions based on the value of the intra-subpartitions split flag for the third block.

14. The method of claim 8, wherein the current block is an intra-predicted block.

15. An apparatus for encoding video data, the apparatus comprising:

a memory; and a processor implemented in circuitry and configured to:

obtain a current block of a picture of video data;

determine that a width of the current block of the picture is greater than a maximum transform block size and determine that a height of the current block is less than or equal to the maximum transform block size;

determine not to signal a first intra-subpartitions mode flag for the current block based on the determination that the width of the current block is greater than the maximum transform block size and the determination that the height of the current block is less than or equal to the maximum transform block size, wherein the first intra-subpartitions mode flag indicates whether the current block is partitioned into rectangular transform block subpartitions; and based on the determination not to signal the first intra-subpartitions mode flag for the current block, not include the first intra-subpartitions mode flag in an encoded video bitstream that includes the current block.

16. The apparatus of claim 15, wherein the processor is further configured to:

obtain a second block of video data;

determine that a width of the second block is less than or equal to the maximum transform block size and determine that a height of the second block is greater than the maximum transform block size;

determine not to signal a second intra-subpartitions mode flag for the second block based on the determination that the width of the second block is less than or equal to the maximum transform block size and the determination that the height of the second block is greater than the maximum transform block size, wherein the second intra-subpartitions mode flag indicates whether the second block is partitioned into rectangular transform block subpartitions; and based on the determination not to signal the second intra-subpartitions mode flag for the second block, not include the second intra-subpartitions mode flag in the encoded video bitstream that includes the current block and the second block.

17. The apparatus of claim 16, wherein the processor is further configured to:

obtain a third block of video data;

determine that a width of the third block is greater than the maximum transform block size and determine that a height of the third block is greater than the maximum transform block size;

determine to signal a third intra-subpartitions mode flag for the third block based on the determination that the width of the third block is greater than the maximum transform block size and the determination that the height of the third block is greater than the maximum transform block size, wherein the third intra-subpartitions mode flag indicates whether the third block is partitioned into rectangular transform block subpartitions; and based on the determination to signal the third intra-subpartitions mode flag for the third block, include the third intra-subpartitions mode flag in the encoded video bitstream that includes the current block, the second block, and the third block.

18. A method of encoding video data, the method comprising:

obtaining a current block of a picture of video data;

determining that a width of the current block of the picture is greater than a maximum transform block size and determining that a height of the current block is less than or equal to the maximum transform block size;

determining not to signal a first intra-subpartitions mode flag for the current block based on the determination that the width of the current block is greater than the maximum transform block size and the determination that the height of the current block is less than or equal to the maximum transform block size, wherein the first intra-subpartitions mode flag indicates whether the current block is partitioned into rectangular transform block subpartitions; and based on the determination not to signal the intra-subpartitions mode flag for the current block, not including the first intra-subpartitions mode flag in an encoded video bitstream that includes the current block.

19. The method of claim 18, further comprising:

obtaining a second block of video data;

determining that a width of the second block is less than or equal to the maximum transform block size and determining that a height of the second block is greater than the maximum transform block size;

determining not to signal a second intra-subpartitions mode flag for the second block based on the determination that the width of the second block is less than or equal to the maximum transform block size and the determination that the height of the second block is greater than the maximum transform block size, wherein the second intra-subpartitions mode flag indicates whether the second block is partitioned into rectangular transform block subpartitions; and based on the determination not to signal the second intra-subpartitions mode flag for the second block, not including the second intra-subpartitions mode flag in the encoded video bitstream that includes the current block and the second block.

20. The method of claim 19, further comprising:

obtaining a third block of video data;

determining that a width of the third block is greater than the maximum transform block size and determining that a height of the third block is greater than the maximum transform block size;

determining to signal a third intra-subpartitions mode flag for the third block based on the determination that the width of the third block is greater than the maximum transform block size and the determination that the height of the third block is greater than the maximum transform block size, wherein the third intra-subpartitions mode flag indicates whether the third block is partitioned into rectangular transform block subpartitions; and based on the determination to signal the third intra-subpartitions mode flag for the third block, including the third intra-subpartitions mode flag in the encoded video bitstream that includes the current block, the second block, and the third block.

\* \* \* \* \*